United States Patent (12)
Matsushita et al.

(10) Patent No.: US 11,531,474 B1
(45) Date of Patent: Dec. 20, 2022

(54) STORAGE SYSTEM AND DATA REPLICATION METHOD IN STORAGE SYSTEM

(71) Applicant: Hitachi, Ltd., Tokyo (JP)

(72) Inventors: Takaki Matsushita, Tokyo (JP); Yusuke Yamaga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/691,159

(22) Filed: Mar. 10, 2022

(30) Foreign Application Priority Data

Oct. 7, 2021 (JP) .............................. JP2021-165438

(51) Int. Cl.
*G06F 3/06* (2006.01)
*G06F 11/14* (2006.01)

(52) U.S. Cl.
CPC .......... *G06F 3/0619* (2013.01); *G06F 3/0644* (2013.01); *G06F 3/0673* (2013.01); *G06F 11/1469* (2013.01); *G06F 2201/84* (2013.01)

(58) Field of Classification Search
CPC ..... G06F 3/0619; G06F 3/0673; G06F 3/0644
See application file for complete search history.

(56) References Cited

U.S. PATENT DOCUMENTS

| 9,646,039 | B2 | 5/2017 | Colgrove et al. | |
| 2003/0204597 | A1* | 10/2003 | Arakawa | G06F 3/067 |
| | | | | 709/219 |
| 2013/0132696 | A1* | 5/2013 | Tomida | G06F 3/0653 |
| | | | | 711/E12.002 |
| 2015/0134928 | A1* | 5/2015 | Goodman | G06F 3/0644 |
| | | | | 711/170 |
| 2015/0253991 | A1* | 9/2015 | Nikaido | G06F 3/0649 |
| | | | | 711/114 |
| 2016/0364400 | A1* | 12/2016 | Isomura | G06F 16/182 |
| 2017/0277469 | A1* | 9/2017 | Cohen | G06F 3/0619 |
| 2018/0046686 | A1* | 2/2018 | Kobayashi | G06F 3/0605 |
| 2020/0117642 | A1* | 4/2020 | Bhandaru | G06F 12/1408 |
| 2021/0103399 | A1* | 4/2021 | Lyu | G06F 3/0673 |
| 2022/0035788 | A1* | 2/2022 | Aharoni | G06F 3/0616 |

* cited by examiner

*Primary Examiner* — Eliyah S. Harper
(74) *Attorney, Agent, or Firm* — Mattingly & Malur, PC

(57) ABSTRACT

In a storage system, processing related to data replication includes associating first control information with a logical volume and a snapshot and second control information with data on a pool volume. Data of the logical volume and the snapshot is managed by associating the first control information with the second control information. A time series of the logical volume and one or more snapshots is managed using generation information associated with the first control information, for each piece of data on the pool volume. Generation information indicating a generation in which the data is created is managed in association with the second control information. Invalidation of the first and second control information asynchronously with a processing of data related to the logical volume and the snapshot is executed. Whether the invalidation is possible is determined by referring to the generation information associated with the first and second control information.

7 Claims, 24 Drawing Sheets

WRITE (SECOND AND SUBSEQUENT TIMES AFTER SS ACQUISITION)

HARDWARE CONFIGURATION

LOGICAL CONFIGURATION

FIG. 12

SNAPSHOT MANAGEMENT TABLE 401

| Volume ID | Snapshot ID | SNAPSHOT ACQUISITION TIME |
|---|---|---|
| 0 | 0x010000 | t0 |
| 0 | 0x010001 | t1 |
| 0 | 0x010002 | t2 |
| 0 | 0x010003 | t3 |
| ... | ... | ... |

FIG. 13

VOL/SS-Dir INFORMATION MANAGEMENT TABLE 402

| | VOL#/SS# | Root VOL# | Dir INFORMATION # |
|---|---|---|---|
| VOL# | 0x0000 | 0x0000 | 0x0000 |
| | 0x0001 | 0x0001 | 0x0005 |
| | ... | ... | ... |
| | 0xFFFF | — | — |
| Snapshot# | 0x010000 | 0x0000 | 0x0001 |
| | 0x010001 | 0x0000 | 0x0002 |
| | ... | ... | ... |
| | 0x10FFFF | — | — |

FIG. 14
LATEST GENERATION# 403
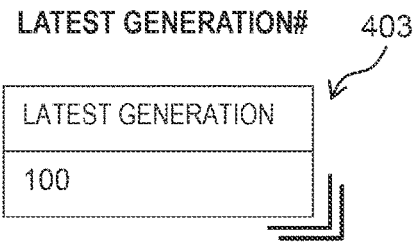
| LATEST GENERATION |
|---|
| 100 |
FIG. 15
COLLECTION REQUEST Dir INFORMATION # MANAGEMENT BITMAP 404
| Dir INFORMATION # | COLLECTION REQUEST |
|---|---|
| 0x0000 | 0 |
| 0x0001 | 1 |
| ... | ... |
| 0xFFFF | 0 |
FIG. 16
Dir INFORMATION GENERATION MANAGEMENT TREE 405
| Dir INFORMATION # | Dir INFORMATION GENERATION # | Prev | Next1 | Next2 |
|---|---|---|---|---|
| 0x0000 | 3 | 0x0001 | --- | --- |
| 0x0001 | 1 | 0x0003 | 0x0002 | 0x0000 |
| 0x0002 | 2 | 0x0001 | --- | --- |
| 0x0003 | 0 | --- | 0x0001 | --- |
| ... | ... | | | |
| 0xFFFF | --- | | | |
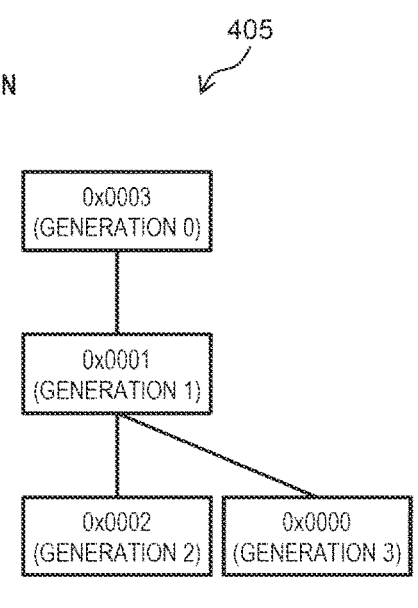

FIG. 17

POOL MANAGEMENT TABLE — 406

| Page Number | Pool Volume ID | Start Address | Status [1:Allocated/0:Free] | ALLOCATION DESTINATION VOL#/SS# | ALLOCATION DESTINATION ADDRESS |
|---|---|---|---|---|---|
| 0 | 0 | 0 | 1 | 0x0001 | 0 |
| 1 | 0 | 100 | 0 | n/a | n/a |
| 2 | 0 | 200 | 1 | 0x010000 | 100 |
| 3 | 1 | 0 | 0 | n/a | n/a |
| 4 | 1 | 100 | 1 | 0x010001 | 100 |
| ... | ... | ... | ... | ... | ... |

FIG. 18

Dir INFORMATION MANAGEMENT TABLE — 407

| VOL/SS INTERNAL ADDRESS | REFERENCE DESTINATION MAPPING INFORMATION # |
|---|---|
| 0x00000000 | 0 |
| 0x00000200 | 1 |
| 0x00000400 | 2 |
| ... | |

FIG. 19

MAPPING INFORMATION MANAGEMENT TABLE — 408

| MAPPING INFORMATION# | REFERENCE DESTINATION POOL ADDRESS(Pool Page Number) | MAPPING INFORMATION GENERATION # |
|---|---|---|
| 0 | 2 | 2 |
| 1 | 5 | 3 |
| 2 | 10 | 1 |
| ... | ... | |

RESTORE SNAPSHOT

COLLECT ASYNCHRONOUS Dir INFORMATION

WRITE (FRONT END)

ADDITIONAL WRITING PROCESSING

STORAGE SYSTEM AND DATA REPLICATION METHOD IN STORAGE SYSTEM

CROSS-REFERENCE TO RELATED APPLICATION

The present application claims priority from Japanese application JP2021-165438, filed on Oct. 7, 2021, the contents of which is hereby incorporated by reference into this application.

BACKGROUND OF THE INVENTION

1. Field of the Invention

The present invention relates to a storage system and a data replication method in a storage system.

2. Description of the Related Art

In recent years, a need for data utilization is increased, and an opportunity of data replication is increased. Accordingly, in a storage system, a snapshot function is more and more important. In the related art, there is a Redirect on Write (RoW) method as a representative implementation means of a snapshot (for example, refer to U.S. Pat. No. 9,646,039 specification). Since there is no data copy in the Row method, there is an advantage that an influence on an I/O performance at a time of creating the snapshot is small. The RoW method is often adopted in an all flash array (AFA) device.

The RoW method is a method of additionally writing data. The additional writing is a data storage method in which, when data is written to the storage system, the data stored before the writing is not overwritten, write data is stored in a new area, and meta information is rewritten so as to refer to the data stored in the new area. The meta information is managed in a tree structure. When the snapshot of a certain replication source volume is acquired, a root of a meta information tree of the replication source volume at that time is referred to from the root of the meta information tree of the snapshot. At this point, since the root of the replication source volume is referred to from the snapshot, rewriting is impossible, and only read is permitted. In addition, a new root is prepared in a replication source in accordance with write to the replication source volume, new meta information that refers to a storage location of update data is created, and a connection is made under the new root. Further, an old root is referred to from the new root such that a data storage location of an unwritten area can be specified.

However, in a technique in the related art, when restoration is performed using the snapshot, it is necessary to invalidate data and meta information that are not referred to, and the restoration takes a long time. In addition, if it is attempted to determine whether to invalidate specific data or meta information without having meta information of a reverse reference system (for example, reference information from storage data of Pool to a primary volume or the snapshot), it is necessary to confirm a presence or absence of reference for all the snapshot, and a processing efficiency of determining whether the invalidation is possible is low.

Therefore, an object of the invention is to speed up the restoration and the determination of whether an invalidation processing is possible, and to shorten a processing time related to data replication.

SUMMARY OF THE INVENTION

The invention has been made in view of the above problems, and an object of the invention is to implement speeding up of a processing related to data replication in a storage system.

In order to achieve the above object, one of representative storage systems of the invention includes: a controller configured to provide a logical volume to a host device; and a physical storage device configured to store data, and is capable of creating a snapshot which is a duplicate of the logical volume. The controller is configured to: form a pool volume corresponding to the logical volume using the physical storage device; store first control information associated with the logical volume and the snapshot and second control information associated with data on the pool volume; manage data of the logical volume and the snapshot by associating the first control information with the second control information; manage a time series of the logical volume and one or a plurality of snapshots using generation information associated with the first control information; manage, for each piece of data on the pool volume, generation information indicating a generation in which the data is created in association with the second control information; execute invalidation of the first control information and/or the second control information asynchronously with a processing of data related to the logical volume and/or the snapshot; and determine whether the invalidation is possible by referring to the generation information associated with the first control information and generation information associated with the second control information in the invalidation.

Further, one of representative data replication methods in a storage system of the invention is a data replication method in a storage system, the storage system including: a controller configured to provide a logical volume to a host device; and a physical storage device configured to store data, and being capable of creating a snapshot which is a duplicate of the logical volume. The data replication method including: by the controller, forming a pool volume corresponding to the logical volume using the physical storage device; storing first control information associated with the logical volume and the snapshot and second control information associated with data on the pool volume; managing data of the logical volume and the snapshot by associating the first control information with the second control information; managing a time series of the logical volume and one or a plurality of snapshots using generation information associated with the first control information; managing, for each piece of data on the pool volume, generation information indicating a generation in which the data is created in association with the second control information; executing invalidation of the first control information and/or the second control information asynchronously with a processing of data related to the logical volume and/or the snapshot; and determining whether the invalidation is possible by referring to the generation information associated with the first control information and generation information associated with the second control information in the invalidation.

According to the invention, in the storage system, the processing related to the data replication can be speeded up.

BRIEF DESCRIPTION OF THE DRAWINGS

FIG. 12 is an explanatory diagram of a configuration of a snapshot management table.

FIG. 13 is an explanatory diagram of a configuration of a VOL/snapshot-Dir information management table.

FIG. 14 is an explanatory diagram of a configuration of a latest generation #.

FIG. 15 is an explanatory diagram of a configuration of a collection request Dir information # management bitmap.

FIG. 16 is an explanatory diagram of a configuration of a Dir information generation management tree.

FIG. 17 is an explanatory diagram of a configuration of a pool management table.

FIG. 18 is an explanatory diagram of a configuration of a Dir information management table.

FIG. 19 is an explanatory diagram of a configuration of a mapping information management table.

DESCRIPTION OF THE PREFERRED EMBODIMENTS

Figure 1:
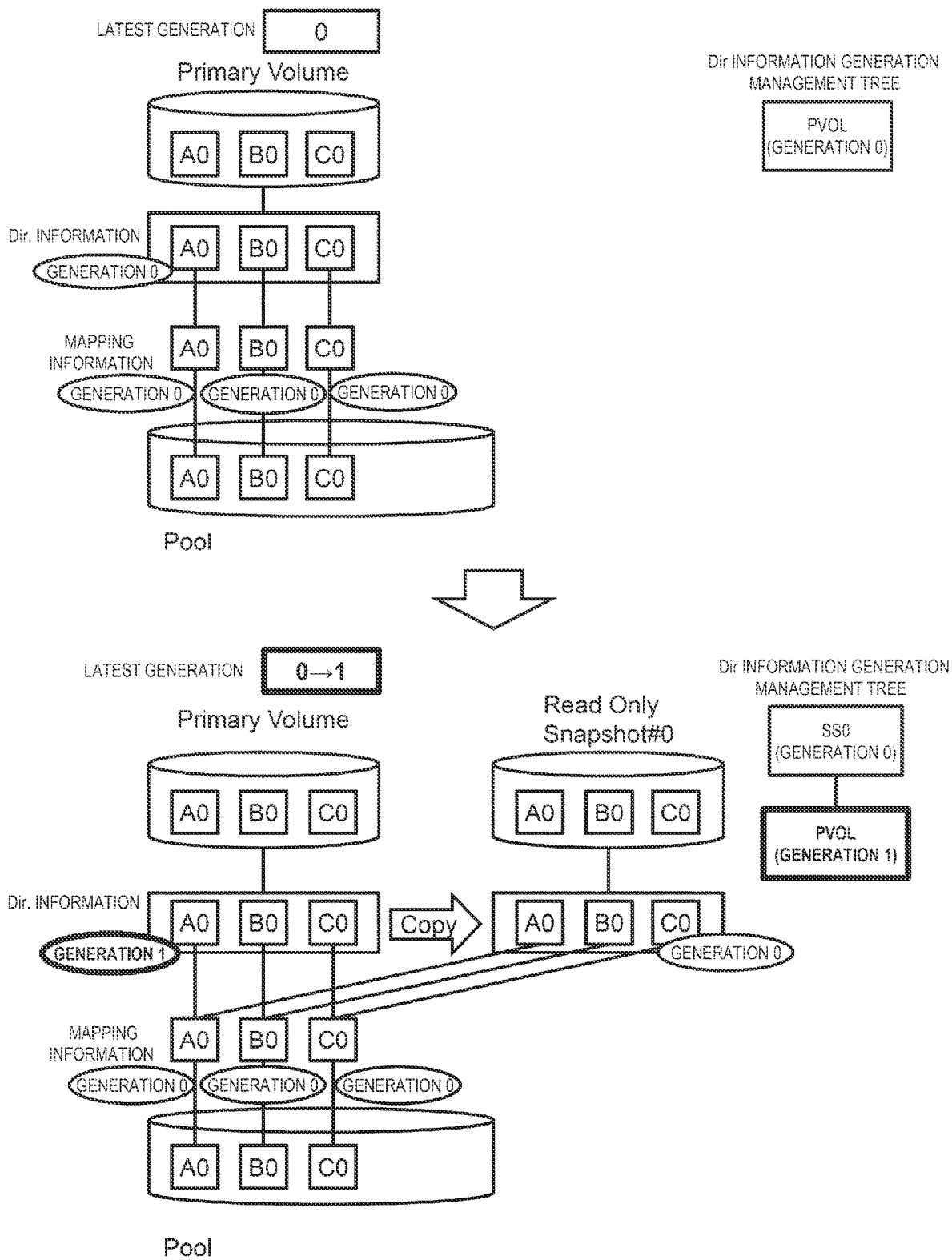
FIG. 1 is an explanatory diagram of snapshot acquisition of a storage system.

Hereinafter, embodiments of the invention will be described with reference to the drawings. The embodiments described below do not limit the invention according to the claims, and all of the elements and combinations thereof described in the embodiments are not necessarily essential to the solution of the invention. In addition, illustration and description may be omitted for well-known configurations that are essential for the configuration of the invention.

In the following description, an expression such as "xxx table" may be used to describe information for which an output can be obtained for an input, but this piece of information may be data having any structure. Therefore, the "xxx table" can be referred to as "xxx information".

In the following description, a configuration of each table is an example, one table may be divided into two or more tables, and all or a part of the two or more tables may be one table.

In the following description, a processing may be described with a "program" as a subject. Since the program is executed by a processor unit to perform a determined processing while appropriately using a storage unit and/or an interface unit, the subject of the processing may be the processor unit (or a device such as a controller including the processor unit thereof).

The program may be installed in a device such as a computer, for example, in a program distribution server or a computer readable (for example, non-transitory) recording medium. In the following description, two or more programs may be implemented as one program, or one program may be implemented as two or more programs.

The "processor unit" means one or a plurality of processors. The processor is typically a microprocessor such as a central processing unit (CPU), and may be another type of processor such as a graphics processing unit (GPU). In addition, the processor may be a single core or a multi-core processor. In addition, the processor may be a processor in a broad sense such as a hardware circuit (for example, a field-programmable gate array (FPGA) or an application specific integrated circuit (ASIC)) that performs a part or all of the processings.

In the following description, an identification number is used as identification information of various targets, but identification information of a type other than the identification number (for example, an identifier including letters and symbols) may be adopted. In the following description, "#" represents a number, and, for example, "xxx #" represents xxx which is identified by a number.

Further, in the following description, in a case of describing the same kind of elements without distinguishing the elements from each other, reference symbols (or common symbols among the reference symbols) are used, and in a case of describing the same kind of elements by distinguishing the elements from each other, the identification number (or the reference symbol) of the elements may be used. In addition, the number of each element illustrated in each drawing is an example, and is not limited to the illustrated number.

First Embodiment

FIG. 1 is an explanatory diagram of snapshot acquisition of a storage system according to a first embodiment.

The storage system can provide a logical volume to a host device. This logical volume is hereinafter referred to as a primary volume (PVOL).

In addition, the storage system can create a snapshot, which is a replication of the primary volume, by a redirect on write (RoW) method.

The storage system forms a pool volume using a physical storage device that stores data, and manages a relationship between the primary volume or the snapshot, and the pool volume using meta information.

The storage system uses directory (Dir) information and mapping information as the meta information.

The directory information is first control information associated with the primary volume or the snapshot.

The mapping information is second control information associated one-to-one with data on the pool volume.

The storage system manages data of the primary volume or the snapshot by associating the directory information with the mapping information.

Further, the storage system manages a time series of the logical volume and the snapshot by generation information associated with the directory information, and manages the generation information indicating a generation where the data is created in association with the mapping information for each piece of data on the pool volume. In addition, the storage system manages latest generation information at that time as a latest generation.

FIG. 1 shows an operation when the storage system creates an initial snapshot.

First, at a stage before the snapshot acquisition, data of "A0", "B0", and "C0" are virtually stored in the primary volume, and the latest generation is "0".

The directory information associated with the primary volume is associated with "0" as the generation information, and includes reference information indicating a reference destination of all the data ("A0", "B0", and "C0") of the primary volume. Hereinafter, when the generation information associated with the directory information is "X", it is expressed that the directory information is a generation X.

In the pool volume, the data of "A0", "B0", and "C0" are actually stored, and the mapping information is associated with each piece of the data ("A0", "B0", and "C0"). Each piece of mapping information is associated with "0" as the generation information. Hereinafter, when the generation information associated with the mapping information is "X", it is expressed that the mapping information is as the generation X.

In the state before the snapshot acquisition, the "A0", "B0", and "C0" of the directory information are the reference information that refers to the "A0", "B0", and "C0" of the mapping information, respectively. By associating the directory information with the mapping information in this manner, the primary volume and the pool volume can be made to correspond to each other, and virtual data processing for the primary volume can be implemented.

In FIG. 1, in a case of the snapshot acquisition, the directory information is copied to obtain the directory information of a read-only snapshot #0. Then, a generation of the directory information of the primary volume is incremented, and the latest generation is also incremented.

As a result, the "A0", "B0", and "C0" of the mapping information are referred to from both the directory information of a generation 0 and the directory information of a generation 1.

In this way, if the snapshot is created by duplicating the directory information, the snapshot can be created without increasing the data and the mapping information on the pool volume.

Here, when the snapshot is acquired, the snapshot in which writing is prohibited at the time of acquisition and the data is fixed is the generation 0, and the pool volume in which the data can be written after the acquisition is the generation 1. The generation 0 is a "one-generation old generation in a direct system" with respect to the generation 1, and is referred to as a "parent" for the sake of convenience. Similarly, the generation 1 is a "one-generation new generation in the direct system" with respect to the generation 0, and is referred to as a "child" for the sake of convenience. The storage system manages a parent-child relationship of generations as a Dir information generation management tree.

Figure 2:
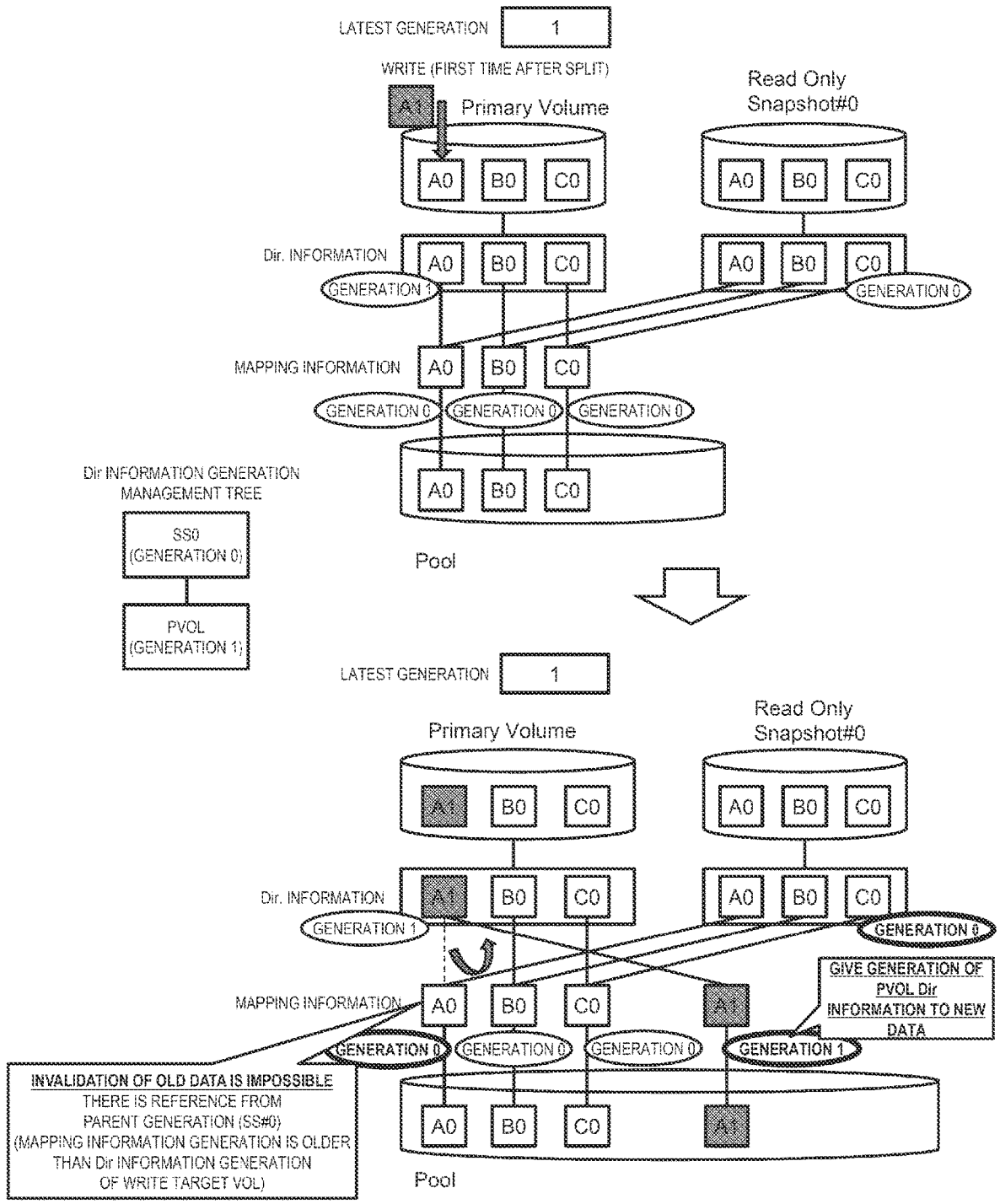
FIG. 2 is an explanatory diagram of initial writing after the snapshot acquisition.

FIG. 2 is an explanatory diagram of initial writing after the snapshot acquisition.

If a write request for rewriting "A0" to "A1" from the host device is received, the storage system confirms a new area of the pool volume and stores the data "A1" to be written. New mapping information "A1" is generated for the new data "A1" of the pool volume, and the generation of the directory information is given as the generation information to the mapping information "A1". Therefore, the mapping information "A1" is the generation 1.

The storage system associates an address of a write destination in the primary volume with the data "A1" to be written by switching a reference relationship (correspondence relationship) between the directory information of the generation 1 and the mapping information.

By this switching of the reference destination, the reference of the mapping information "A0" from the directory information of the generation 1 is canceled. However, since the mapping information "A0" is still referred to from the directory information (generation 0) of a snapshot #0, invalidation is not to be permitted.

In the determination of whether to perform this invalidation, by comparing the generation of the mapping information to be determined whether to perform the invalidation and the generation of the directory information of a write target VOL (here, the primary volume), it may be determined that the invalidation is possible if both match, and the invalidation is not possible if a mapping information generation is older. A new state does not occur in the mapping information generation.

Figure 3:
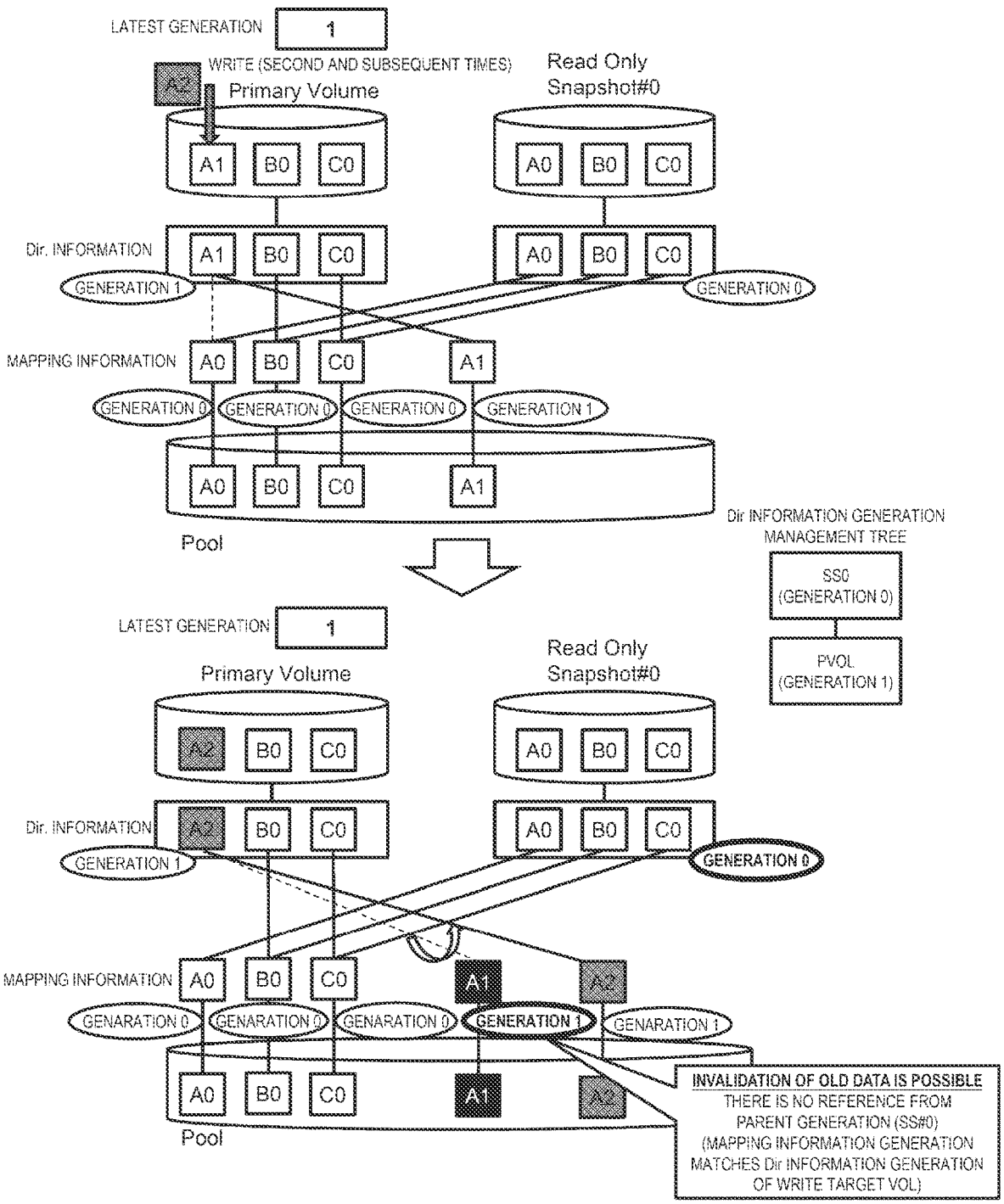
FIG. 3 is an explanatory diagram of second and subsequent writing after the snapshot acquisition.

FIG. 3 is an explanatory diagram of second and subsequent writing after the snapshot acquisition.

If a write request for rewriting "A1" to "A2" from the host device is received, the storage system confirms a new area of the pool volume and stores the data "A2" to be written. New mapping information "A2" is generated for the new data "A2" of the pool volume, and the generation of the directory information is given as the generation information to the mapping information "A2". Therefore, the mapping information "A2" is the generation 1.

The storage system associates the address of the write destination in the primary volume with the data "A2" to be written by switching the reference relationship (correspondence relationship) between the directory information of the generation 1 and the mapping information.

By this switching of the reference destination, the reference of the mapping information "A1" from the directory information of the generation 1 is canceled, and the mapping information "A1" is not referred to from any piece of directory information, so that the invalidation is possible.

Specifically, since the mapping information "A1" is the generation 1 and matches the directory information "generation 1" of the write target VOL, it is determined that the invalidation is possible. The data "A1" on the pool volume can also be invalidated.

Figure 4:
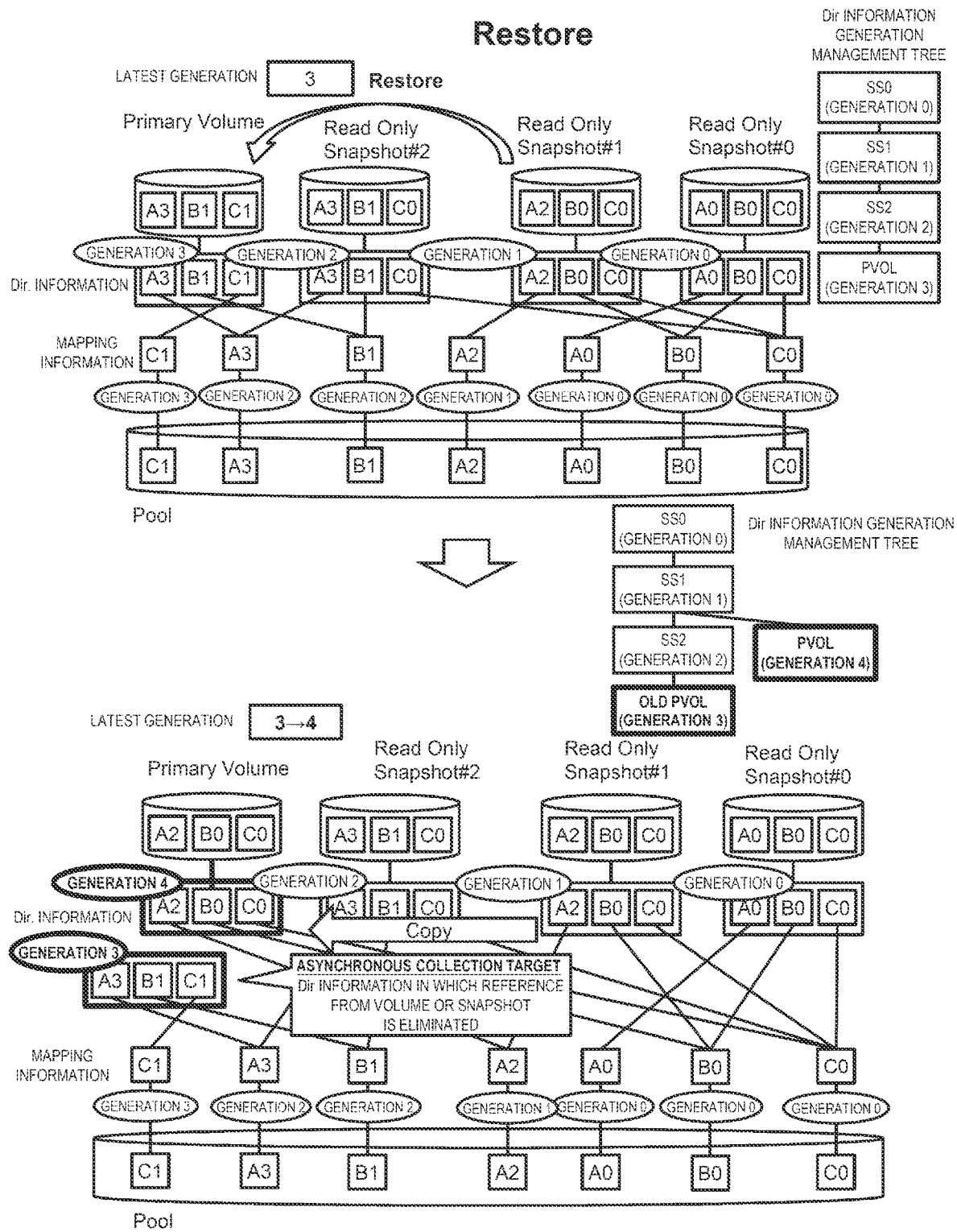
FIG. 4 is an explanatory diagram of restoration from a snapshot.

FIG. 4 is an explanatory diagram of restoration from the snapshot. As a premise, three snapshots #0 to #2 from the generation 0 to a generation 2 are sequentially created, and the latest generation is "3".

In a case of the restoration from a snapshot SS #1, the directory information of the generation 1 is duplicated and associated with the primary volume, and the latest generation is incremented. As a result, the latest generation is "4", and the directory information of the primary volume is also the generation 4.

The primary volume of the generation 4 includes the snapshot of the generation 1 as the parent. Therefore, the snapshot of the generation 1 includes the snapshot of the generation 2 and the primary volume of the generation 4 as the children.

By the restoration, the directory information of the generation 3 is released from the correspondence relationship with the primary volume, and becomes an asynchronous collection target in which the reference from the primary volume or the snapshot is eliminated. That is, the generation 3 is specified as a target generation of the invalidation.

Figure 5:
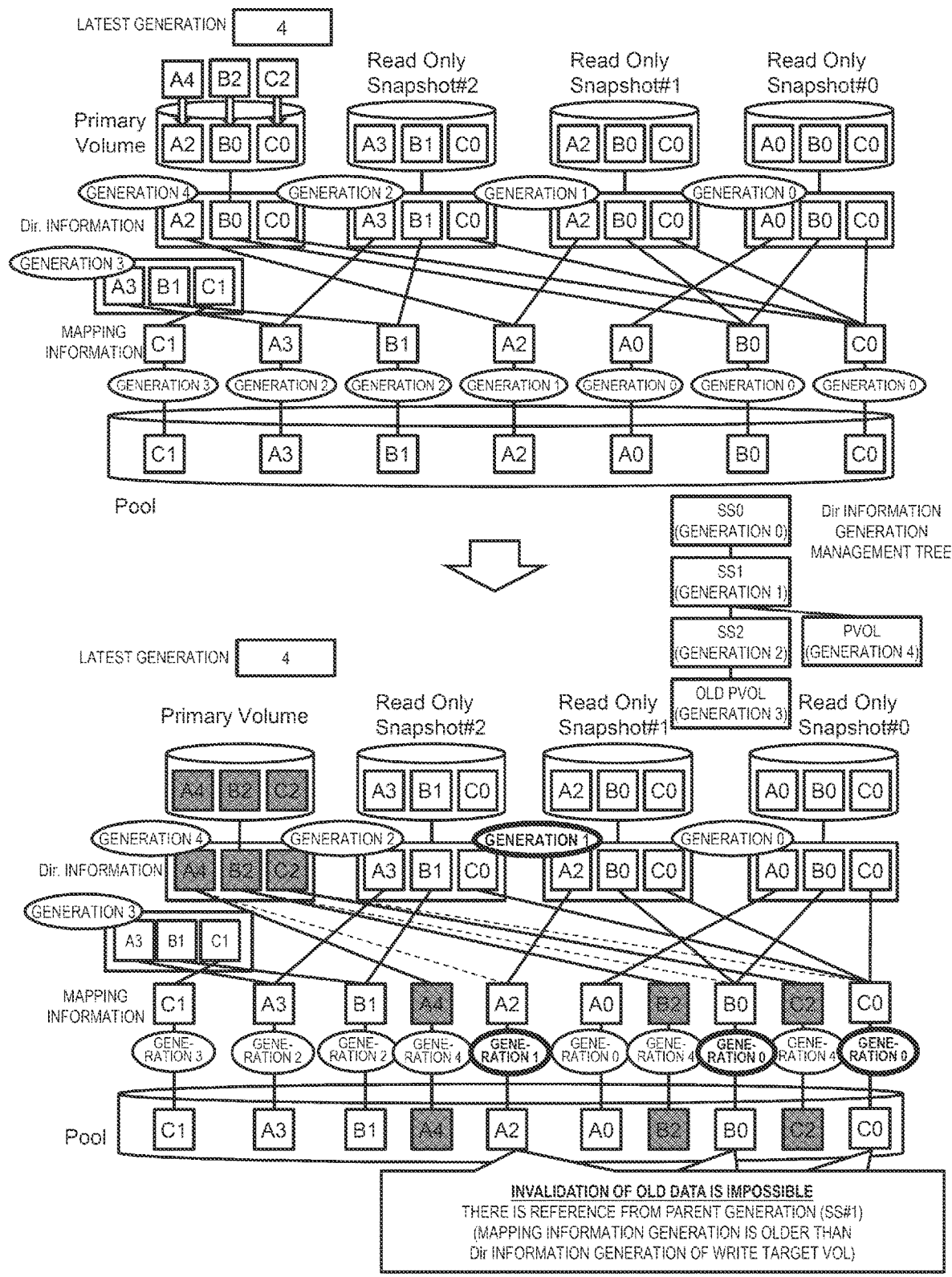
FIG. 5 is an explanatory diagram of initial writing after the restoration.

FIG. 5 is an explanatory diagram of initial writing after the restoration.

At an end time of the restoration, the data of the primary volume is "A2", "B0", and "C0".

When receiving a first write request for each of "A2", "B0", and "C0" from the host device and writing "A4", "B2", and "C2", the storage system respectively stores "A4", "B2", and "C2" in the pool volume, and generates new mapping information "A4", "B2", and "C2". The mapping information of "A4", "B2", and "C2" is the generation 4.

The storage system completes the writing by switching the reference relationship (correspondence relationship) between the directory information of the generation 4 and the mapping information. By this switching, the directory information of the "A2", "B0", and "C0" is not referred to from the primary volume, but is referred to from the snapshot of the generation 1 which is a parent generation (generation of the write target VOL>generation of the mapping information). Therefore, the directory information of the "A2", "B0", and "C0" cannot be invalidated, and the data "A2", "B0", and "C0" in the pool volume also cannot be invalidated.

Figure 6:
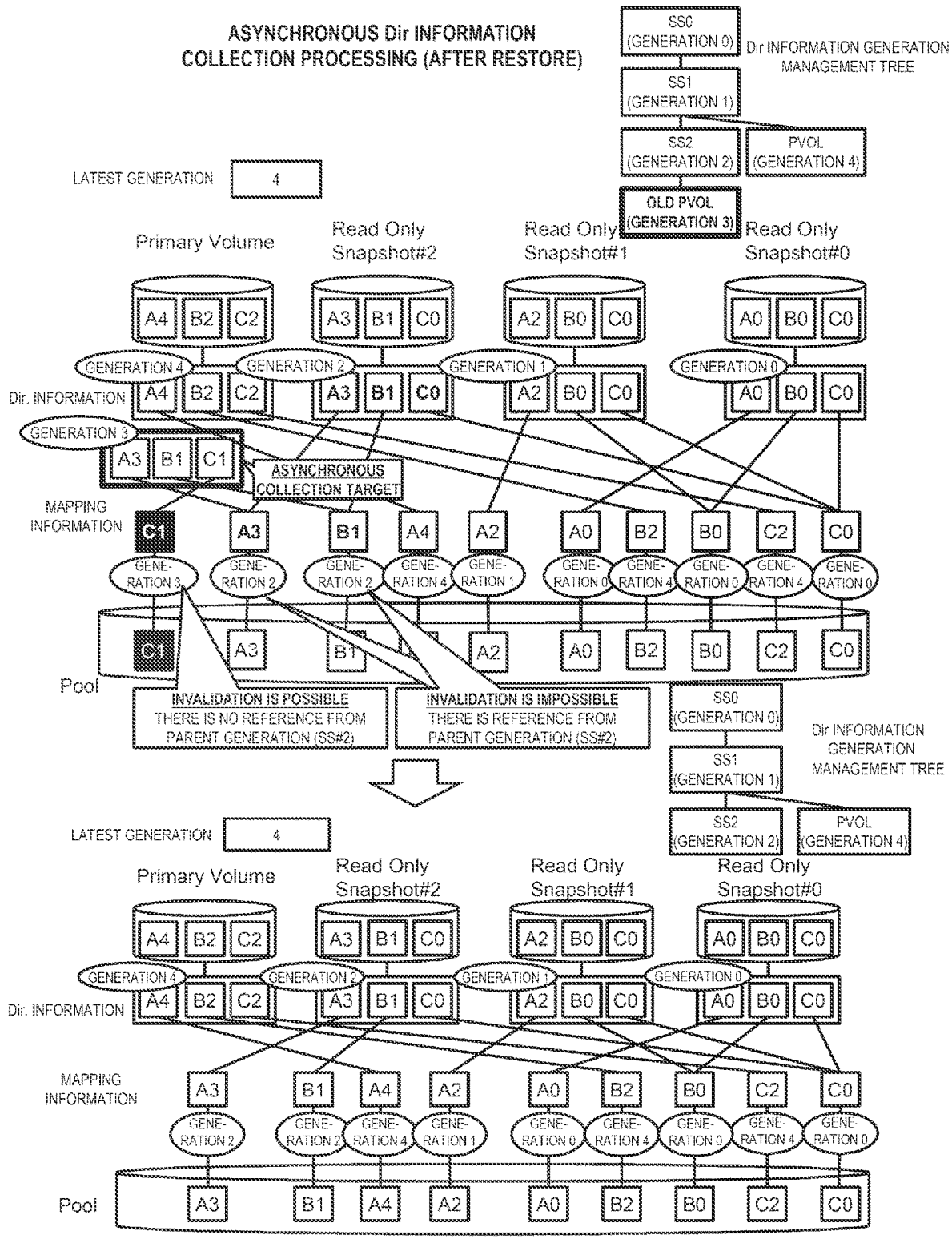
FIG. 6 is an explanatory diagram of a collection processing of asynchronous directory information after the restoration.

FIG. 6 is an explanatory diagram of a collection processing of the asynchronous directory information after the restoration. As described above, if the directory information of the generation 3 is specified as an invalidation target by the restoration, the storage system invalidates the directory information of the generation 3 asynchronously with the restoration.

In FIG. 6, the directory information of the generation 3 refers to "A3", "B1", and "C1". Therefore, the storage system compares the generation of the mapping information of the "A3", "B1", and "C1" with the parent generation, and checks a presence or absence of the reference. In this example, since the generation 3 to be invalidated is an upper end of a generation management tree (=has no child), it is not necessary to confirm a child generation.

Here, the parent generation to be compared with the generation of the mapping information is the parent of the directory information of the generation 3 to be invalidated and the generation thereof is "2". Therefore, if the generation of the mapping information is larger than the parent generation, the invalidation is possible.

Specifically, the mapping information "C1" is the generation 3 and is larger than the generation 2 of the parent generation. That is, since the mapping information "C1" is not referred to from the snapshot of the generation 2, the invalidation is possible. On the other hand, the mapping information "A3" and "B1" are the generation 2 and are equal to the generation 2 of the parent generation. That is, since the mapping information "A3" and "B1" are referred to from the snapshot of the generation 2, the invalidation is impossible.

As a result of the invalidation of the directory information to be invalidated and the invalidatable mapping information, as shown in FIG. 6, the directory information of the generation 3 is deleted, and the mapping information "C3" and the data "C3" on the pool volume are deleted.

Figure 7:
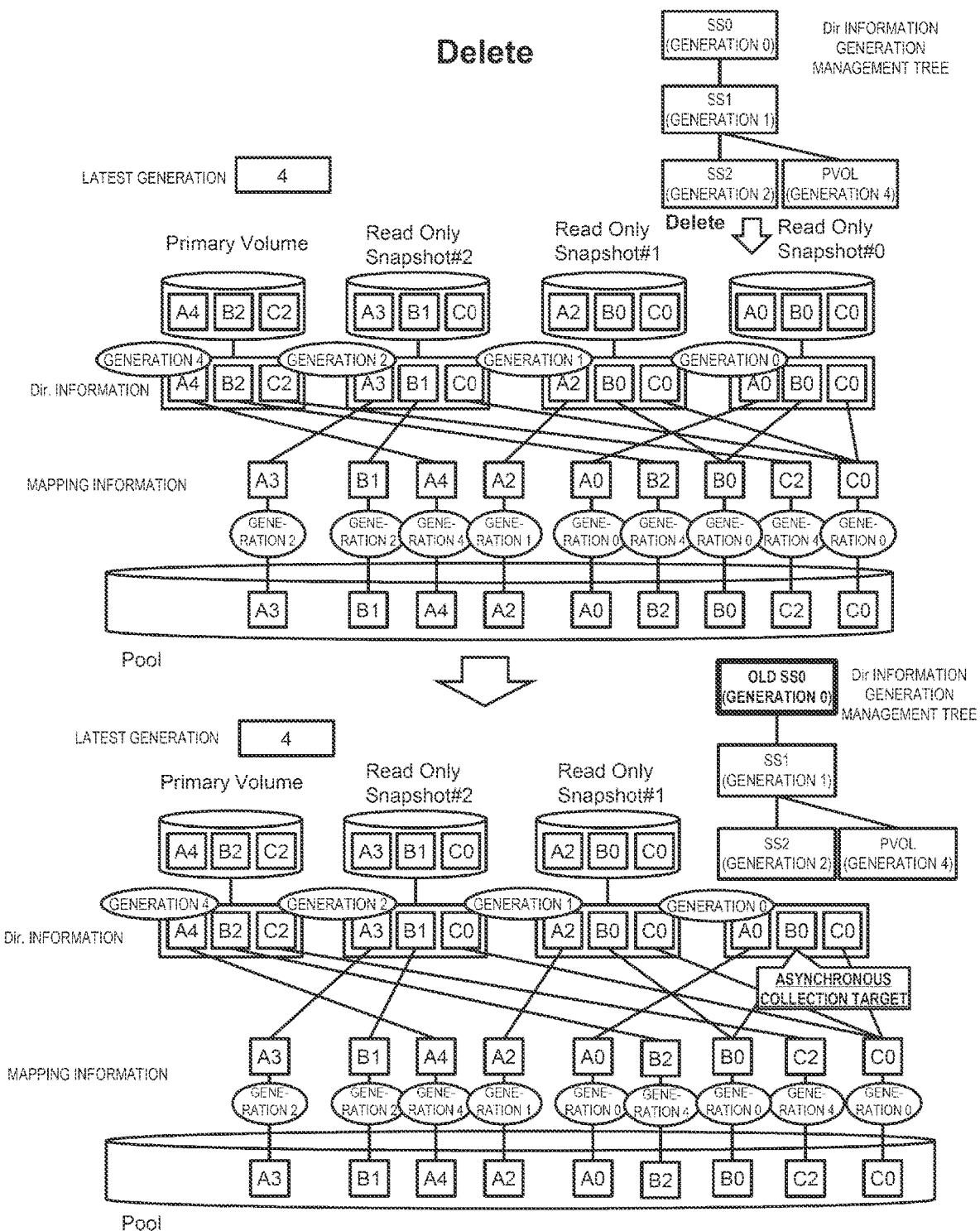
FIG. 7 is an explanatory diagram of deletion of the snapshot.

FIG. 7 is an explanatory diagram of the deletion of the snapshot. In FIG. 7, a child of the snapshot #0 is the snapshot #1, and a child of the snapshot #1 is the primary volume of the generation 4 and the snapshot #2. In this state, when the snapshot #0 is deleted, the storage system immediately deletes the snapshot #0, and regards the directory information of the generation 0 from which no reference is made from the snapshot #0 as the asynchronous collection target. The generation 0 is specified as the target generation of the invalidation.

Figure 8:
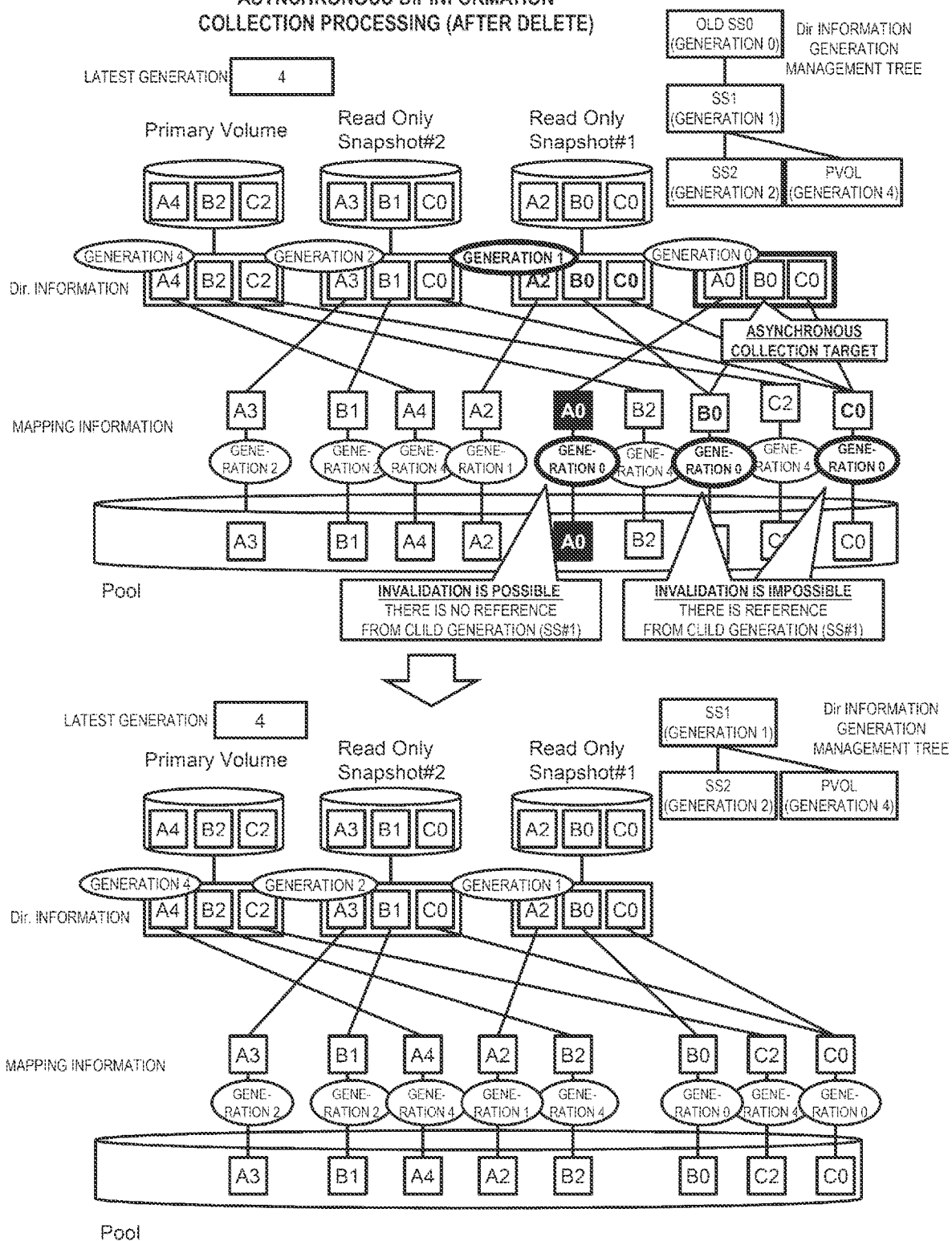
FIG. 8 is an explanatory diagram of a collection processing of the asynchronous directory information after the deletion of the snapshot.

FIG. 8 is an explanatory diagram of a collection processing of the asynchronous directory information after the deletion of the snapshot. If the directory information of the generation 0 is specified as the invalidation target by the deletion of the snapshot #0, the storage system invalidates the directory information of the generation 0 asynchronously with the deletion of the snapshot.

In this invalidation, the storage system determines that the invalidation is possible for the mapping information referred to (associated with) the directory information of the target generation, when the generation of the mapping information is newer than the parent generation of the target generation and is also not referred to from the child generation of the target generation. In this way, when the directory information having the child is invalidated, it is necessary to confirm the presence or absence of the reference from the child.

In FIG. 8, the directory information of the generation refers to the mapping information "A0", "B0", and "C0". In addition, no parent generation exists in the target generation 0. Therefore, the storage system determines whether the mapping information "A0", "B0", and "C0" are referred to from the directory information of the generation 1 which is the child generation of the target generation.

Since the directory information of the generation 1 refers to the "A2", "B0", and "C0", it is determined that the mapping information "A0" can be invalidated, and the mapping information "B0" and "C0" cannot be invalidated.

In FIG. 6, the child generation is one, but when there are two child generations, the Dir information generation tree after the collection is separated, and therefore an invalidation processing is skipped.

As a result of the invalidation of the directory information to be invalidated and the invalidatable mapping information, as shown in FIG. 8, the directory information of the generation 0 is deleted, and the mapping information "A0" and the data "A0" on the pool volume are deleted.

Figure 9:
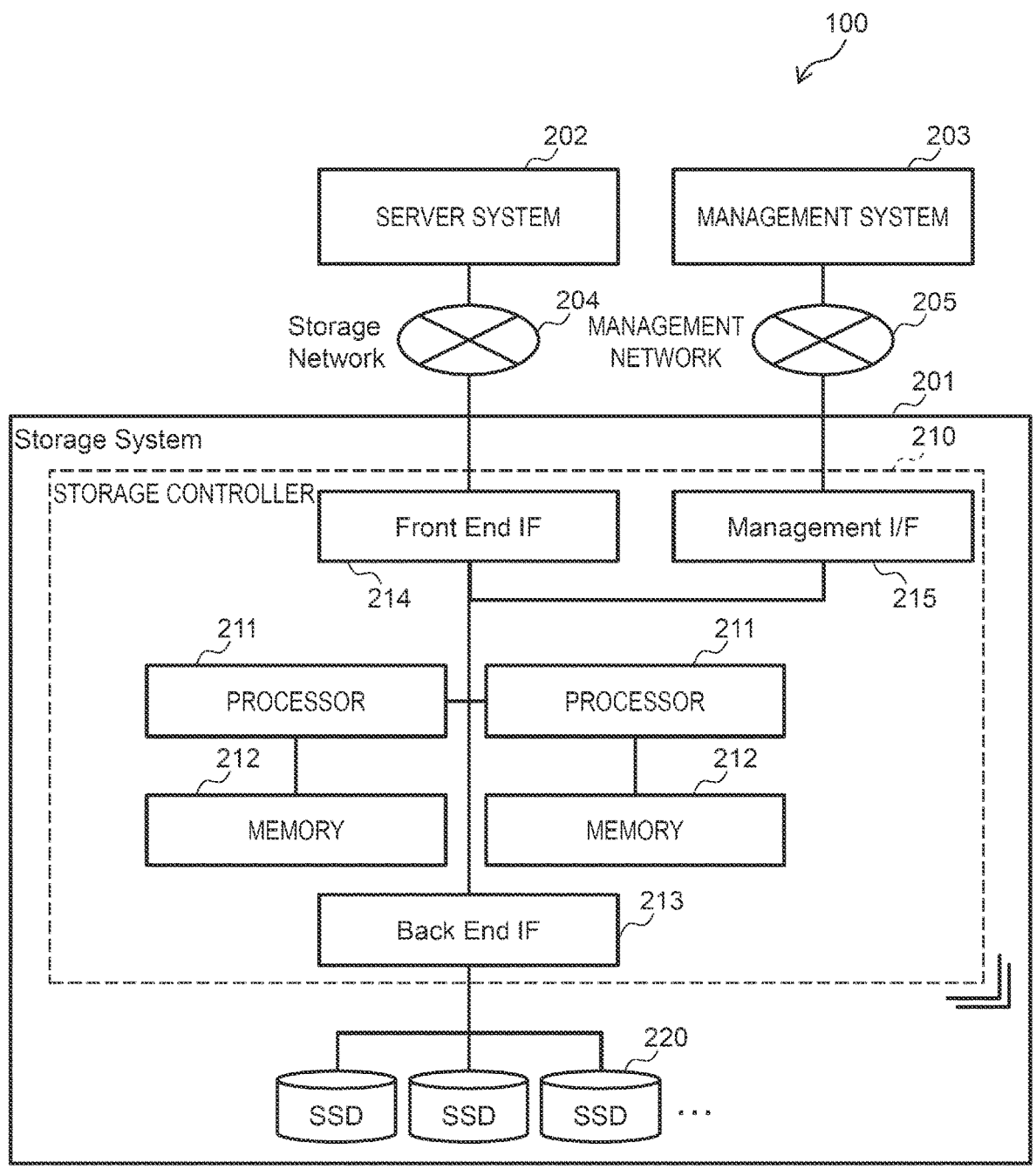
FIG. 9 is an explanatory diagram of a hardware configuration of a computing system 100.

FIG. 9 is an explanatory diagram of a hardware configuration of a computing system 100 according to the first embodiment. The computing system 100 includes a storage system 201, a server system 202, and a management system 203. The storage system 201 and the server system 202 are connected via a storage network 204 using a fiber channel (FC) or the like. The storage system 201 and the management system 203 are connected via a management network 205 using Internet Protocol (IP) or the like. The storage network 204 and the management network 205 may be the same communication network.

The storage system 201 includes a plurality of storage controllers 210 and a plurality of SSDs 220. The SSDs 220, which are physical storage devices, are connected to the storage controllers 210.

The storage controller 210 includes one or more processors 211, one or more memories 212, a back end interface 213, a front end interface 214, and a management interface 215.

The processor 211 is an example of the processor unit. The processor 211 may include a hardware circuit that performs compression and decompression. In the present embodiment, the processor 211 performs control related to read/write, creation of a snapshot, the restoration, deletion of the snapshot, the collection and deletion of the meta information, and the like.

The memory 212 is an example of the storage unit. The memory 212 stores a program executed by the processor 211, data used by the processor 211, and the like. The processor 211 executes the program stored in the memory 212. In the present embodiment, for example, the memory is duplicated in a set of the memory 212 and the processor 211.

The back end interface 213, the front end interface 214, and the management interface 215 are examples of the interface unit.

The back end interface 213 is a communication interface device that mediates exchange of data between the SSDs 220 and the storage controller 210. The plurality of SSDs 220 are connected to the back end interface 213.

The front end interface 214 is a communication interface device that mediates exchange of data between the server system 202 and the storage controller 210. The server system 202 is connected to the front end interface 214 via the storage network 204.

The management interface 215 is a communication interface device that mediates exchange of data between the management system 203 and the storage controller 210. The management system 203 is connected to the management interface 215 via the management network 205.

The server system 202 includes one or more host devices. The server system 202 transmits an I/O request (write request or read request) designating an I/O destination to the storage controller 210. The I/O destination is, for example, a logical volume number such as logical unit number (LUN), or a logical address such as logical block address (LBA).

The management system 203 includes one or more management devices. The management system 203 manages the storage system 201.

Figure 10:
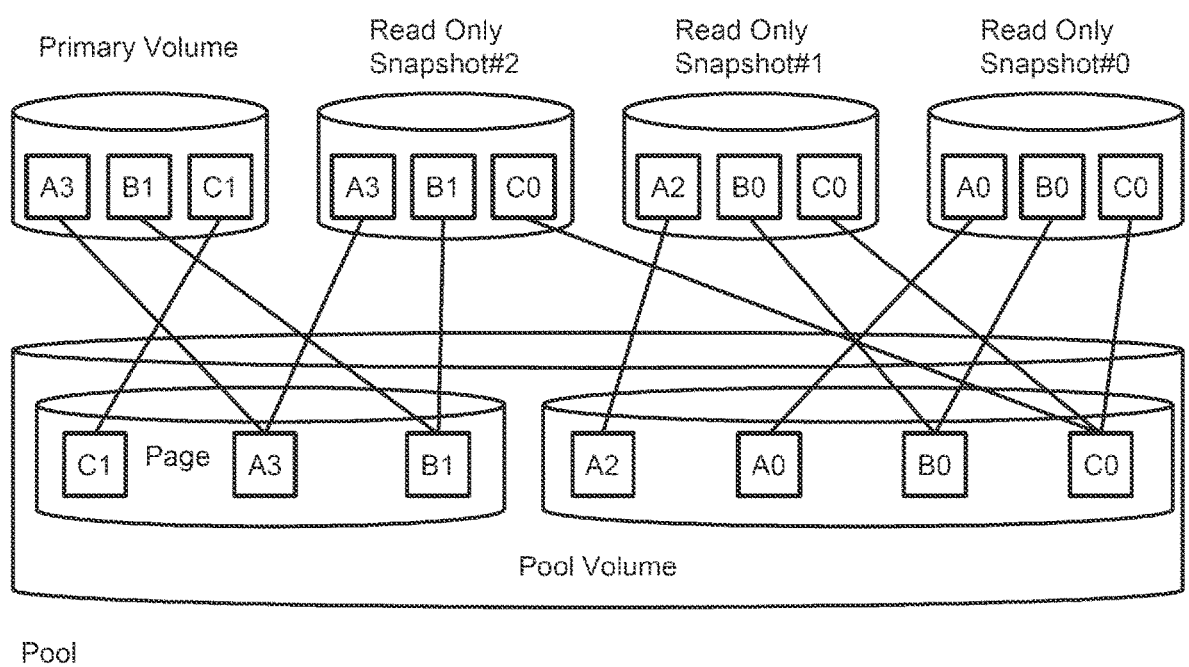
FIG. 10 is an explanatory diagram of a logical configuration of the storage system.

FIG. 10 is an explanatory diagram of a logical configuration of the storage system 201. The I/O destination specified by the server system 202 is the logical volume number, the logical address, or the like of the primary volume. As described above, the primary volume refers to the data on the pool volume via the meta information (not shown). With this reference relationship, the read/write of the data with respect to the primary volume can be processed as the read/write to the pool volume.

Further, the storage system 201 implements the creation of the snapshot of the primary volume by duplicating the meta information. Therefore, even if the data is redundantly stored in the primary volume or the snapshot, since the same data in the pool volume is referred to, it is not necessary to redundantly store the data in the pool volume.

Figure 11:
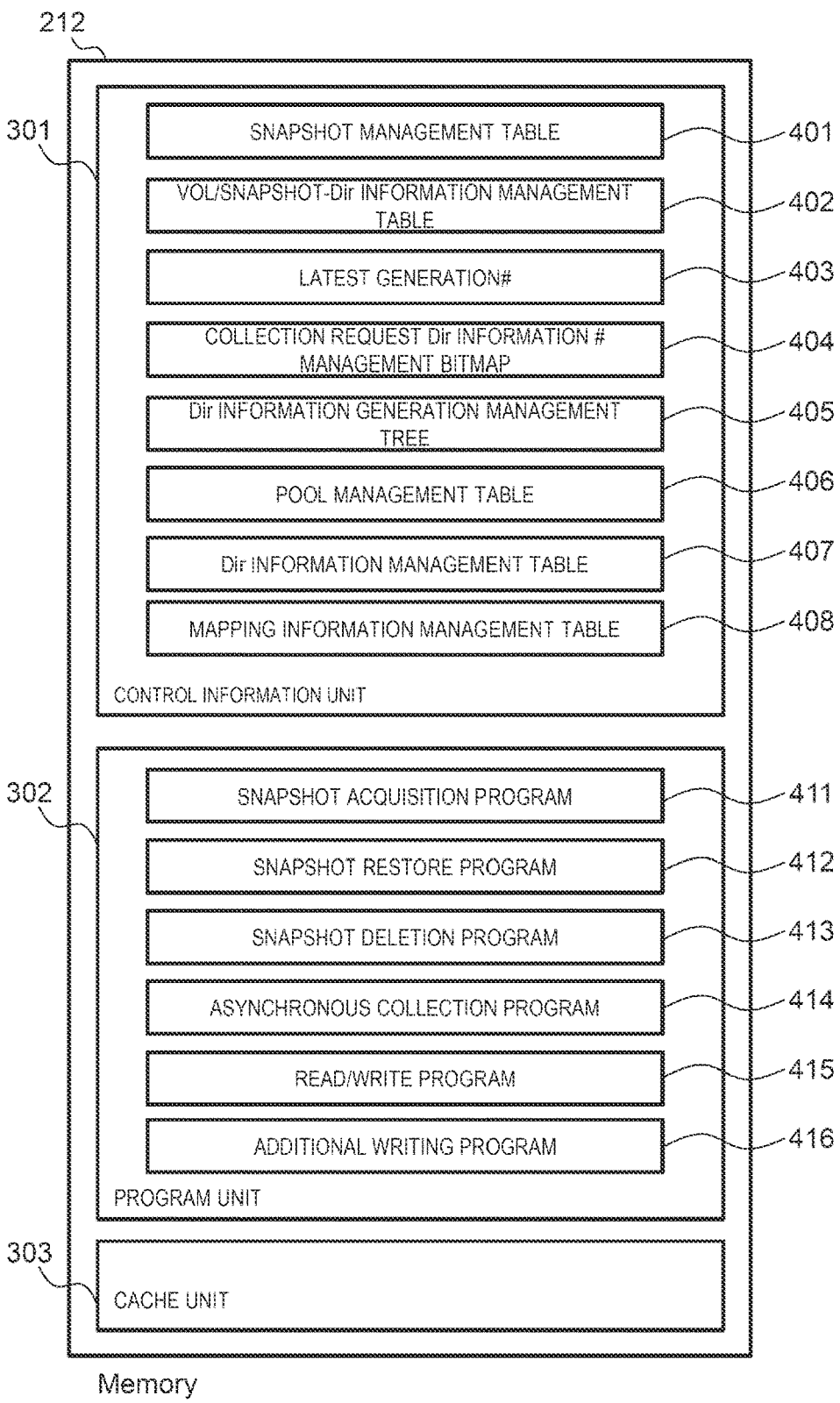
FIG. 11 is an explanatory diagram of a program and information used by the storage system.

FIG. 11 is an explanatory diagram of programs and information used by the storage system 201. A memory area of the memory 212 is used as a control information unit 301, a program unit 302, and a cache unit 303.

At least a part of the memory area may be an independent memory.

The control information unit 301 stores a snapshot management table 401, a VOL/snapshot-Dir information management table 402, a latest generation #403, a collection request Dir information # management bitmap 404, a Dir information generation management tree 405, a pool management table 406, a Dir information management table 407, and a mapping information management table 408. These tables will be described later with reference to the drawings.

The program unit 302 stores a snapshot acquisition program 411, a snapshot restore program 412, a snapshot deletion program 413, an asynchronous collection program 414, a read/write program 415, an additional writing program 416, and the like. These programs are provided for each of the plurality of storage controllers 210 and cooperate with each other to perform a target processing.

A data set to be written or read to or from the SSDs 220 is temporarily stored in the cache unit 303.

FIG. 12 is an explanatory diagram of a configuration of the snapshot management table 401. The snapshot management table 401 is a table in which an ID of the snapshot acquired from the primary volume and an acquisition time of the snapshot are associated with an ID of the primary volume. When there is a plurality of primary volumes, the snapshot management table 401 is provided for each of the primary volumes.

FIG. 13 is an explanatory diagram of a configuration of the VOL/snapshot-Dir information management table 402. The VOL/snapshot-Dir information management table 402 includes VOL #/SS #, Root VOL #, and Dir information #.

The VOL #/SS # is information for specifying the primary volume or the snapshot. The Root VOL # indicates which primary volume corresponds to. If the VOL #/SS # is the primary volume, the VOL #/SS # matches the Root VOL #. The Dir information # specifies the directory information corresponding to the VOL #/SS #.

FIG. 14 is an explanatory diagram of a configuration of the latest generation #403. The latest generation #403 is the generation of the primary volume provided to the host device, and when there is the plurality of primary volumes, the latest generation #403 exists for each of the primary volumes.

FIG. 15 is an explanatory diagram of a configuration of the collection request Dir information # management bitmap 404. The collection request Dir information # management bitmap 404 manages a flag of a collection request for each piece of the Dir information #. For example, "1" is given as a flag to the Dir information # requesting collection, and "0" is given as a flag to the Dir information # that does not request the collection.

FIG. 16 is an explanatory diagram of a configuration of the Dir information generation management tree 405. The Dir information generation management tree 405 includes the Dir information #, Dir information generation #, Prev, Next 1, and Next 2.

The Dir information # is information for specifying the directory information, and the Dir information generation # denotes the generation of the directory information. The Prev indicates the parent of the directory information, and the Next 1 and the Next 2 indicate the children of the directory information.

FIG. 17 is an explanatory diagram of a configuration of the pool management table 406. The pool management table 406 includes a page number for dividing a storage area on the pool volume, an ID of the pool volume, a start address, a status, an allocation destination VOL #/SS #, and an allocation destination address.

The status indicates whether the storage area has been allocated.

If the status is [1: allocated], the allocation destination VOL #/SS # and the allocation destination address indicate which volume or which address of the snapshot the storage area is allocated to.

If the status is [0: free], the allocation destination VOL #/SS # and the allocation destination address indicate "n/a".

FIG. 18 is an explanatory diagram of a configuration of the Dir information management table 407.

The Dir information management table 407 is a table that associates a VOL/SS internal address with reference destination mapping information #. The Dir information management table 407 is provided for each primary volume and each snapshot.

FIG. 19 is an explanatory diagram of a configuration of the mapping information management table 408. The mapping information management table 408 is a table that associates mapping information #, a reference destination pool address, and a mapping information generation #, and indicates which storage area of the pool volume the mapping information refers to and the generation of the mapping information.

Figure 20:
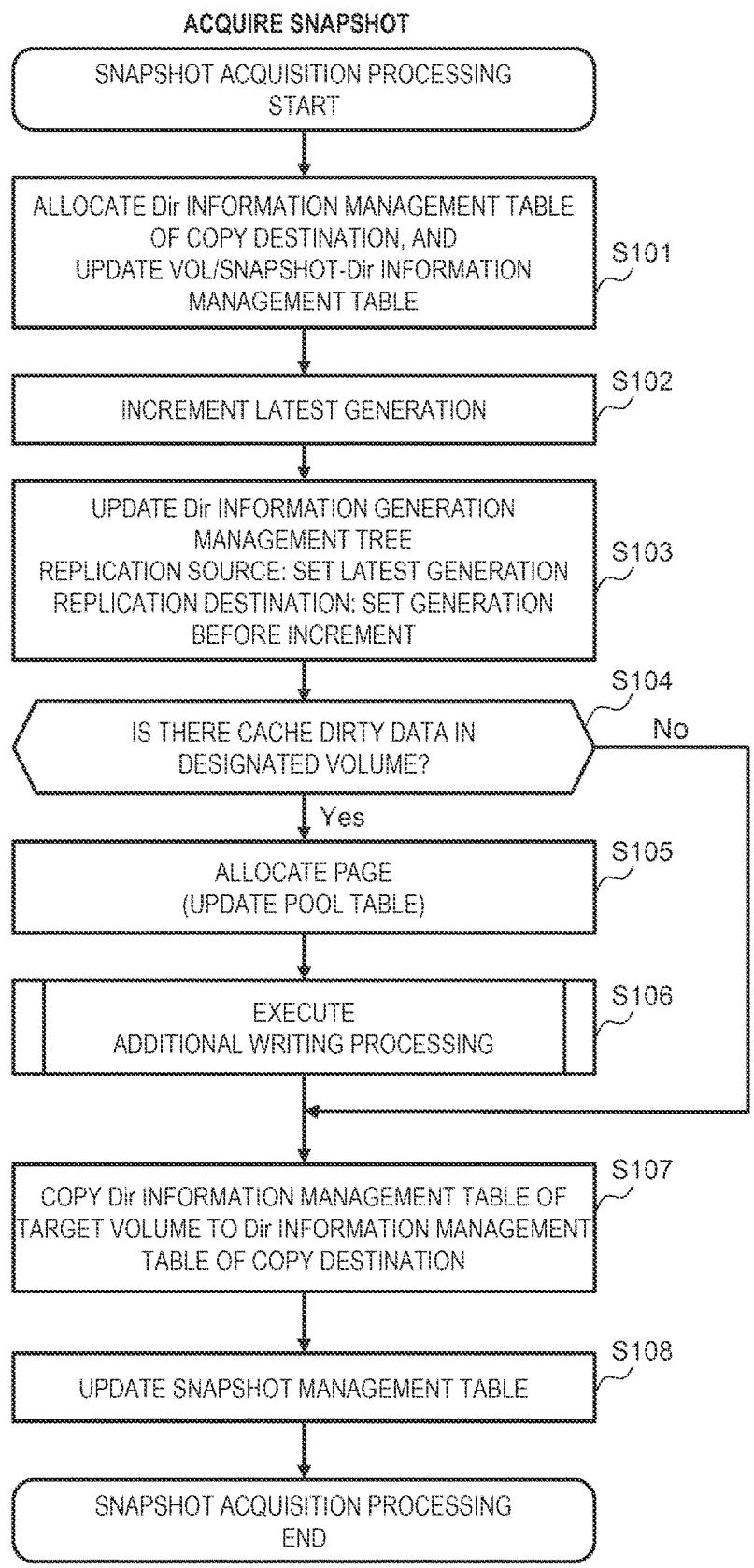
FIG. 20 is a flowchart showing a processing procedure of a snapshot acquisition processing.

FIG. 20 is a flowchart showing a processing procedure of a snapshot acquisition processing. The snapshot acquisition processing is executed by the snapshot acquisition program 411 in response to an instruction from the management system 203.

First, the snapshot acquisition program 411 allocates the Dir information management table 407 as a copy destination, and updates the VOL/snapshot-Dir information management table 402 (step S101).

The snapshot acquisition program 411 increments the latest generation (step S102), and updates the Dir information generation management tree 405 (step S103). At this time, the latest generation is set to a replication source, and the generation before the increment is set to a replication destination.

The snapshot acquisition program 411 determines whether there is cache dirty data in a designated volume (step S104).

If there is the cache dirty data in the designated volume (step S104; Yes), the snapshot acquisition program 411 allocates a page to update the pool management table 406 (step S105), and executes the additional writing processing (step S106).

After the additional writing processing or when there is no cache dirty data in the designated volume (step S104; No), the snapshot acquisition program 411 copies the Dir information management table 407 of a target volume to the Dir information management table 407 of the copy destination (step S107).

Thereafter, the snapshot management table 401 is updated (step S108), and the processing ends.

Figure 21:
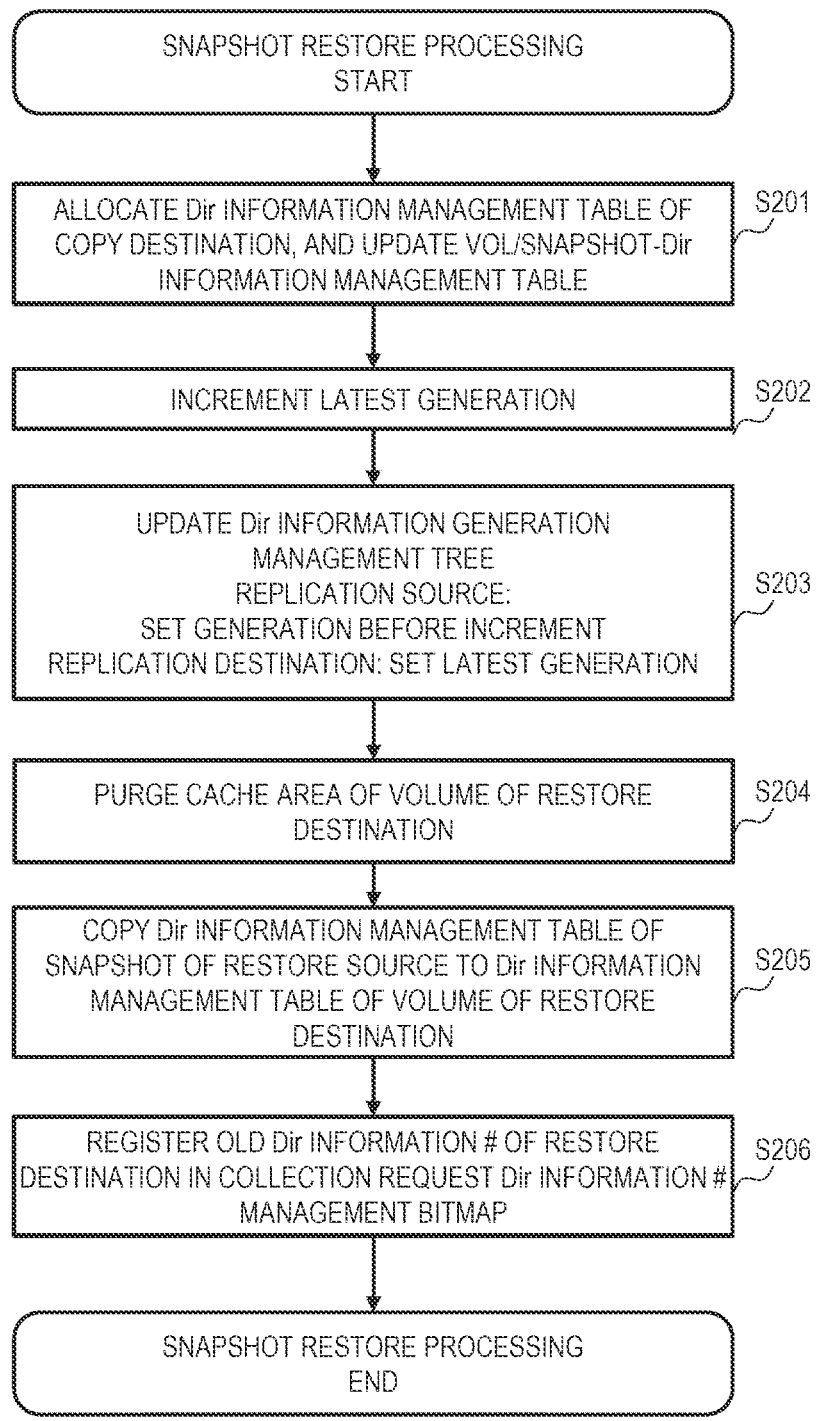
FIG. 21 is a flowchart showing a processing procedure of a snapshot restore processing.

FIG. 21 is a flowchart showing a processing procedure of a snapshot restore processing. The snapshot restore processing is executed by the snapshot restore program 412 in response to an instruction from the management system 203.

First, the snapshot restore program 412 allocates the Dir information management table 407 as a restore destination, and updates the VOL/snapshot-Dir information management table 402 (step S201).

The snapshot restore program 412 increments the latest generation (step S202), and updates the Dir information generation management tree 405 (step S203). At this time, the generation before the increment is set to the replication source, and the latest generation is set to the replication destination.

The snapshot restore program 412 purges a cache area of the volume of the restore destination (step S204).

The snapshot restore program 412 copies the Dir information management table 407 of the volume of a restore source to the Dir information management table 407 of the restore destination (step S205).

Thereafter, old Dir information # of the restore destination is registered in the collection request Dir information # management bitmap 404 (step S206), and the processing ends.

Figure 22:
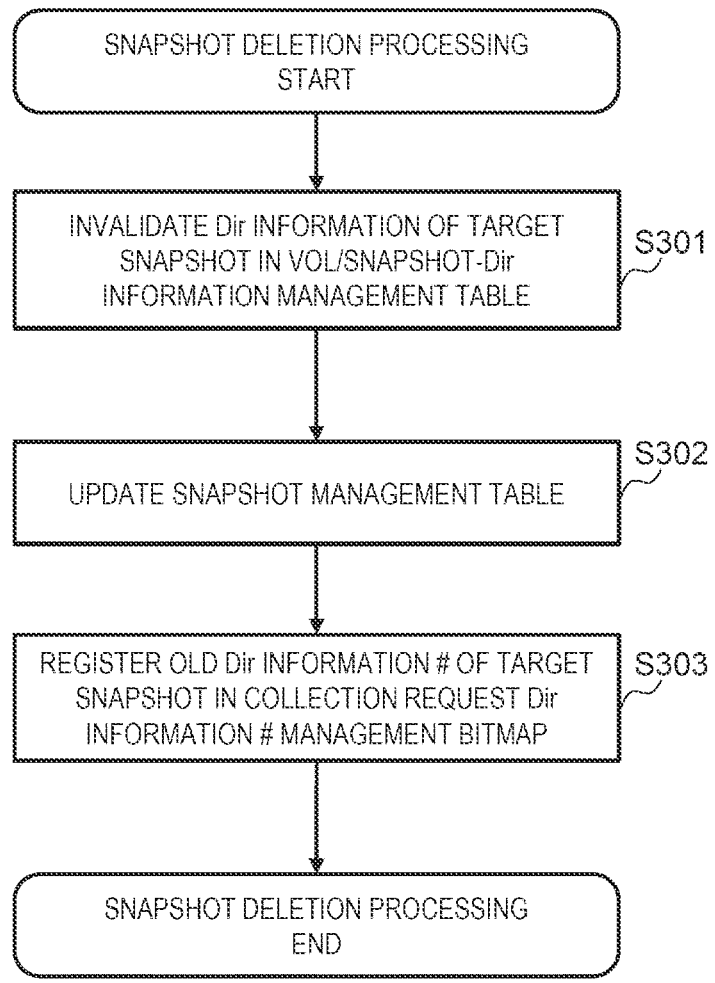
FIG. 22 is a flowchart showing a processing procedure of a snapshot deletion processing.

FIG. 22 is a flowchart showing a processing procedure of a snapshot deletion processing. The snapshot deletion processing is executed by the snapshot deletion program 413 in response to an instruction from the management system 203.

First, the snapshot deletion program 413 invalidates the directory information of the snapshot to be deleted in the VOL/snapshot-Dir information management table 402 (step S301).

Then, the snapshot management table 401 is updated (step S302), the old Dir information # of the snapshot to be deleted is registered in the collection request Dir information # management bitmap 404 (step S303), and the processing ends.

Figure 23:
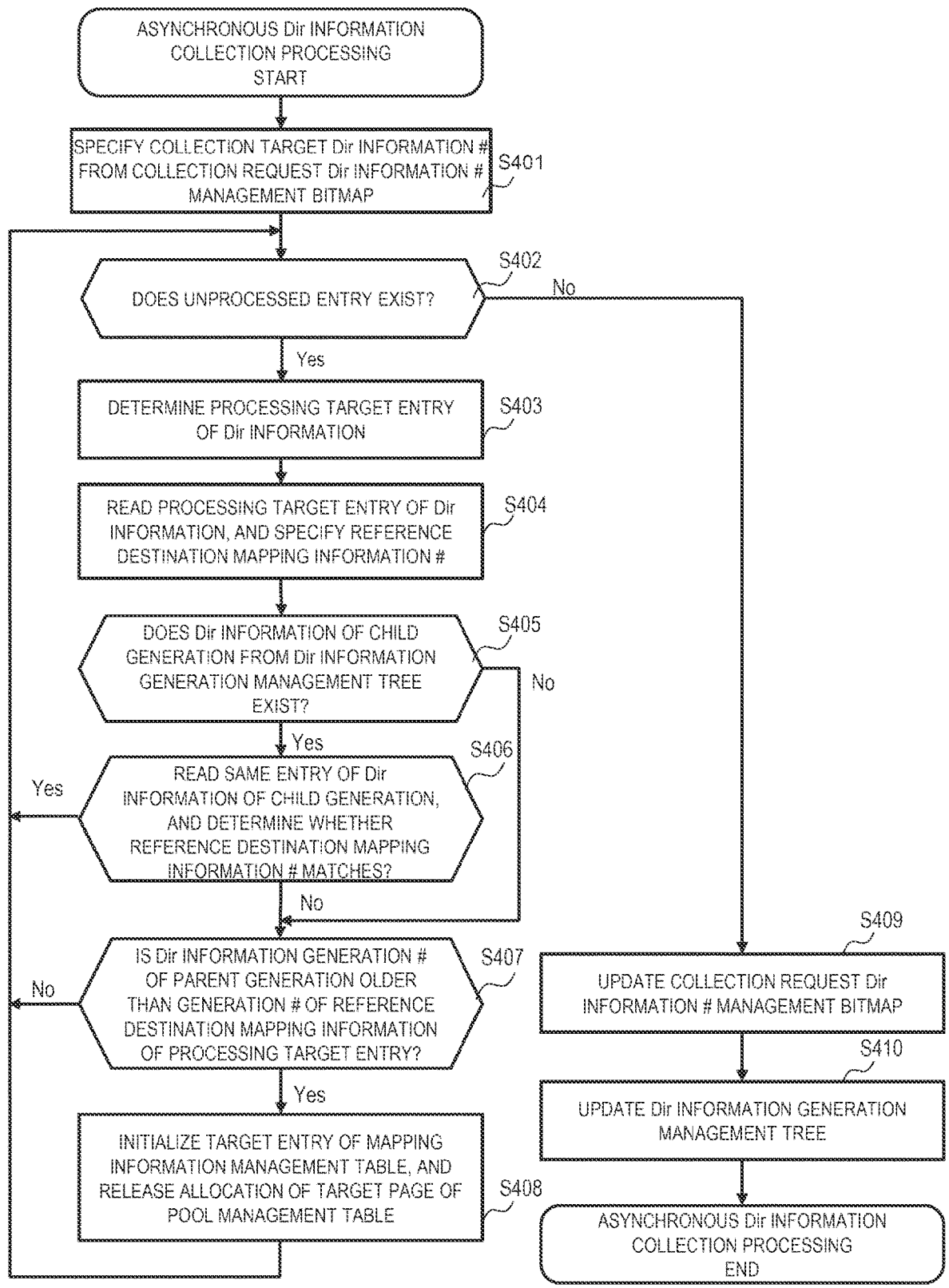
FIG. 23 is a flowchart showing a processing procedure of an asynchronous directory information collection processing.

FIG. 23 is a flowchart of a processing procedure of an asynchronous directory information collection processing. The asynchronous directory information collection processing is executed periodically, for example, by the asynchronous collection program 414.

First, the asynchronous collection program 414 specifies collection target Dir information # from the collection request Dir information # management bitmap 404 (step S401). At this time, the asynchronous collection program 414 refers to the Dir information generation management tree 405, confirms an entry of the directory information in which a collection request bit is set, and does not select the directory information including two children.

Thereafter, the asynchronous collection program 414 determines whether an unprocessed entry exists (step S402).

If the unprocessed entry exists (step S402; Yes), the asynchronous collection program 414 determines a processing target entry of the directory information (step S403), reads the processing target entry of the directory information, and specifies the reference destination mapping information # (step S404).

The asynchronous collection program 414 determines whether the directory information of the child generation from the Dir information generation management tree 405 exists (step S405).

If the directory information of the child generation exists (step S405; Yes), the asynchronous collection program 414 reads the same entry of the directory information of the child generation, and determines whether the reference destination mapping information # matches the same entry of the directory information of the child generation (step S406).

If the same entry of the directory information of the child generation matches the reference destination mapping information # (step S406; Yes), the processing returns to step S402.

If the same entry of the directory information of the child generation does not match the reference destination mapping information # (step S406; No), or if the directory information of the child generation does not exist (step S405; No), the asynchronous collection program 414 determines whether a directory information generation # of the parent generation is older than a generation # of the reference destination mapping information of the processing target entry (step S407).

If the directory information generation # of the parent generation is not older than the generation # of the reference destination mapping information of the processing target entry (step S407; No), the processing returns to S402.

If the directory information generation # of the parent generation is older than the generation # of the reference destination mapping information of the processing target entry (step S407; Yes), the asynchronous collection program 414 initializes a target entry of the mapping information management table, and releases the allocation of a target page of the pool management table 406 (step S408). Thereafter, the processing returns to step S402.

If it is determined in step S402 that no unprocessed entry exists (step S402; No), the asynchronous collection program 414 updates the collection request Dir information # management bitmap 404 (step S409), updates the Dir information generation management tree 405 (step S410), and ends the processing.

Figure 24:
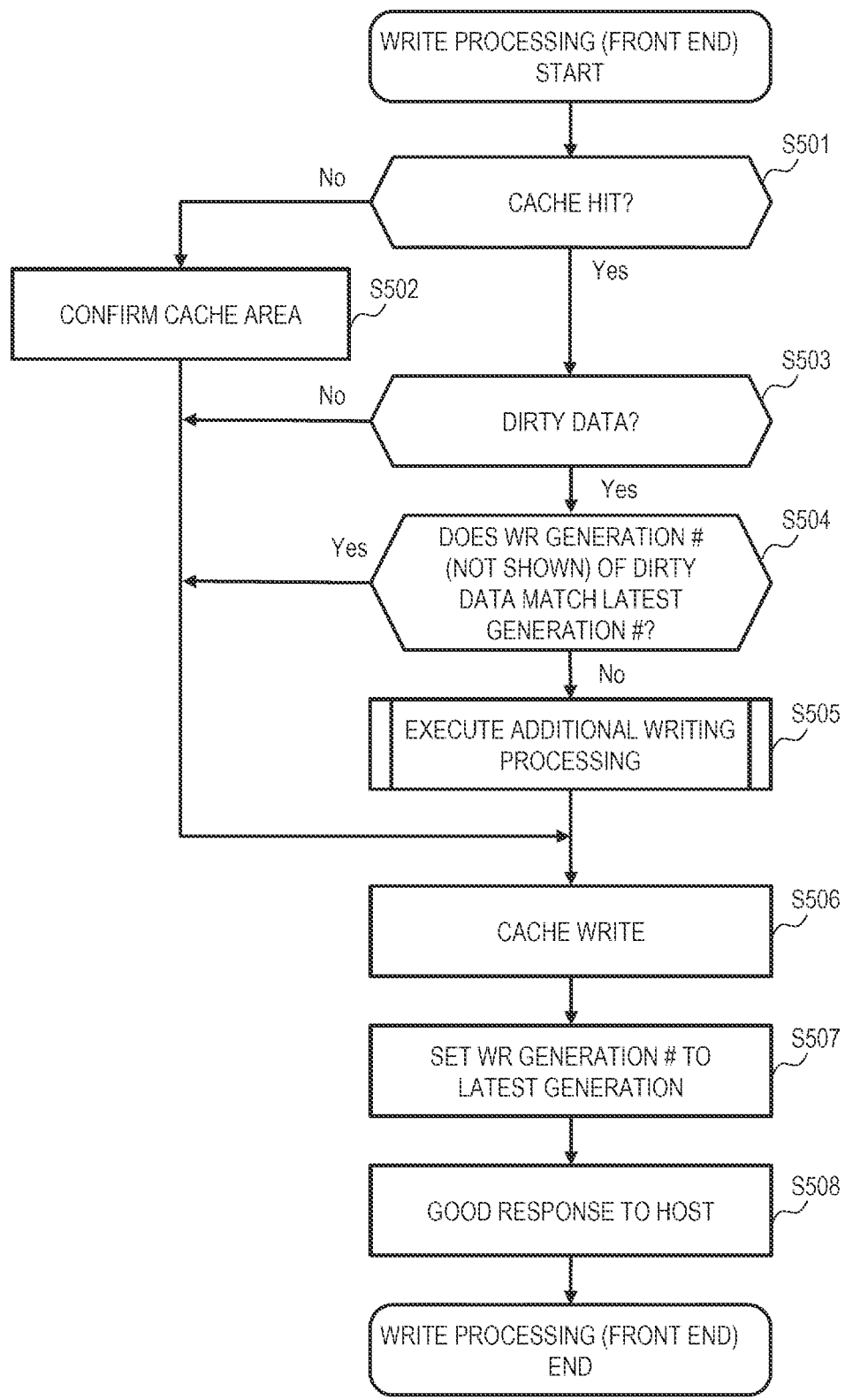
FIG. 24 is a flowchart showing a processing procedure of a front end write processing.

FIG. 24 is a flowchart showing a processing procedure of a front end write processing. The front end write processing is executed by the read/write program 415 when the write request from the host device is received.

First, the read/write program 415 refers to the cache unit 303 and determines whether target data of the write request from the host device is in a cache hit. The read/write program 415 proceeds the processing to S503 when the target data of the write request is in the cache hit (step S501; Yes), and proceeds the processing to S502 when the target data of the write request is not in the cache hit (step S501; No). In S502, the read/write program 415 confirms the cache area in the cache unit 303.

In S503, the read/write program 415 determines whether the target data in the cache hit in S501 is dirty data. The read/write program 415 proceeds the processing to S504 when the target data in the cache hit in S501 is the dirty data (step S503; Yes), and proceeds the processing to S506 when the target data is not the dirty data (step S504; No).

In S504, the read/write program 415 determines whether a WRight (WR) generation # of the dirty data determined in S503 matches the generation # of the target data of the write request. The WR generation # is stored in management information (not shown) of cache data. The generation # of the target data of the write request is acquired from the latest generation #403. In S504, before the additional writing processing of the target data (dirty data) of the snapshot acquired immediately before is performed, the dirty data is updated with the target data of the write request, and the data of the snapshot is prevented from being rewritten. The read/write program 415 proceeds the processing to S506 when the WR generation # and the latest generation # match (step S504; Yes), and proceeds the processing to S505 when the WR generation # and the latest generation # do not match (step S504; No).

In S505, the read/write program 415 executes the additional writing processing. In S505, the dirty data of the WR generation # that does not match the latest generation # is written in a pool, and destage is performed from the cache unit 303.

In S506, the read/write program 415 writes the target data of the write request to the cache area confirmed in S502 or the cache area in which the dirty data requiring the additional writing processing can be subjected to the additional writing processing and the dirty data can be generated again.

In S507, the read/write program 415 sets the WR generation # of the cache data written in the cache unit 303 in S506 to the latest generation # compared in S504. In S508, the read/write program 415 returns a normal response (good response) to the host device.

Figure 25:
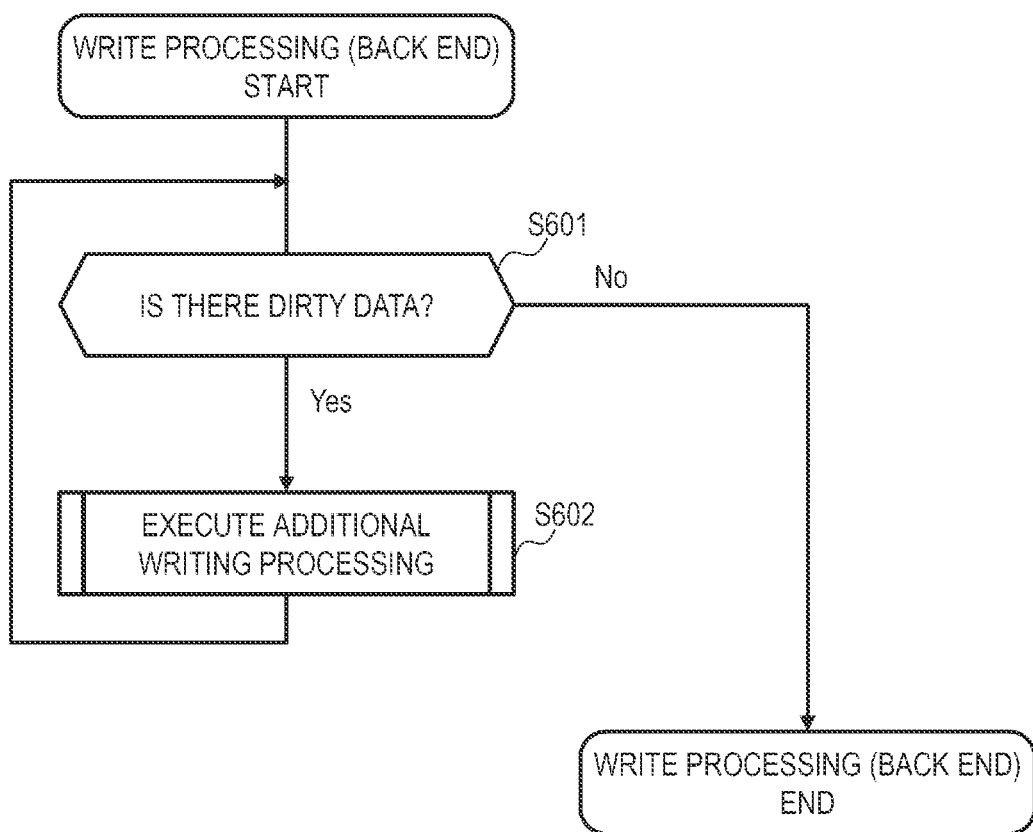
FIG. 25 is a flowchart showing a processing procedure of a back end write processing.

FIG. 25 is a flowchart showing a process procedure of a back end write processing. The back end write processing is a processing of writing unreflected data to the pool when the unreflected data (dirty data) is in the cache unit 303. The back end write processing is performed synchronously or asynchronously with the front end write processing. The back end write processing is executed by the read/write program 415.

First, in S601, the read/write program 415 determines whether there is the dirty data in the cache unit 303. The read/write program 415 proceeds the processing to S602 when there is the dirty data in the cache unit 303 (step S601; Yes), and ends the back end write processing when there is no dirty data (step S602; No). In S602, the read/write program 415 executes the additional writing processing.

Figure 26:
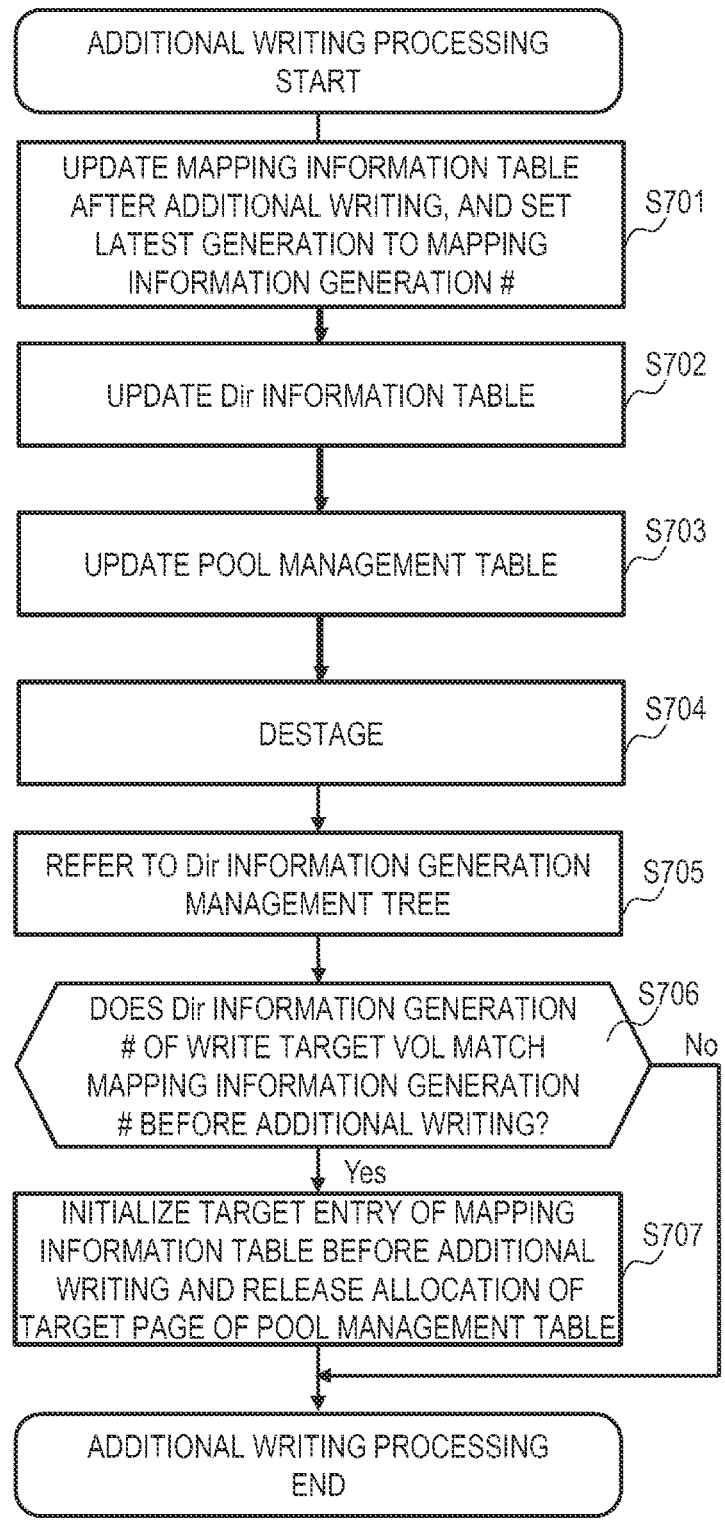
FIG. 26 is a flowchart showing a processing procedure of an additional writing processing.

FIG. 26 is a flowchart showing a processing procedure of the additional writing processing. The additional write processing is executed by the additional writing program 416 called by the snapshot acquisition program 411 and the read/write program 415.

First, the additional writing program 416 updates the mapping information management table 408 after the additional writing, and sets the latest generation as the generation of the mapping information (step S701).

Thereafter, the additional writing program 416 updates the Dir information management table 407 (step S702), updates the pool management table 406 (step S703), and performs the destage from the cache unit 303 (step S704).

Thereafter, the additional writing program 416 refers to the Dir information generation management tree 405 (step S705), and determines whether the Dir information generation # of the write target VOL matches the mapping information generation # before the additional writing (step S706).

If the Dir information generation # of the write target VOL is older than the mapping information generation # before the additional writing (step S706; No), the processing ends as it is.

If the Dir information generation # of the write target VOL matches the mapping information generation # before the additional writing (step S706; Yes), the additional writing program 416 initializes the target entry of the mapping information management table 408 before the additional writing, releases the allocation of the target page of the pool management table 406 (step S707), and ends the processing.

Second Embodiment

In the first embodiment, the snapshot in which the writing is prohibited has been described as an example, but it is also possible to acquire a snapshot in which the writing is permitted. In a second embodiment, the creation of the snapshot in which the writing is permitted, the writing to the snapshot, and the restoration will be described. In the second embodiment, the snapshot in which the writing is permitted is referred to as a writable snapshot.

Figure 27:
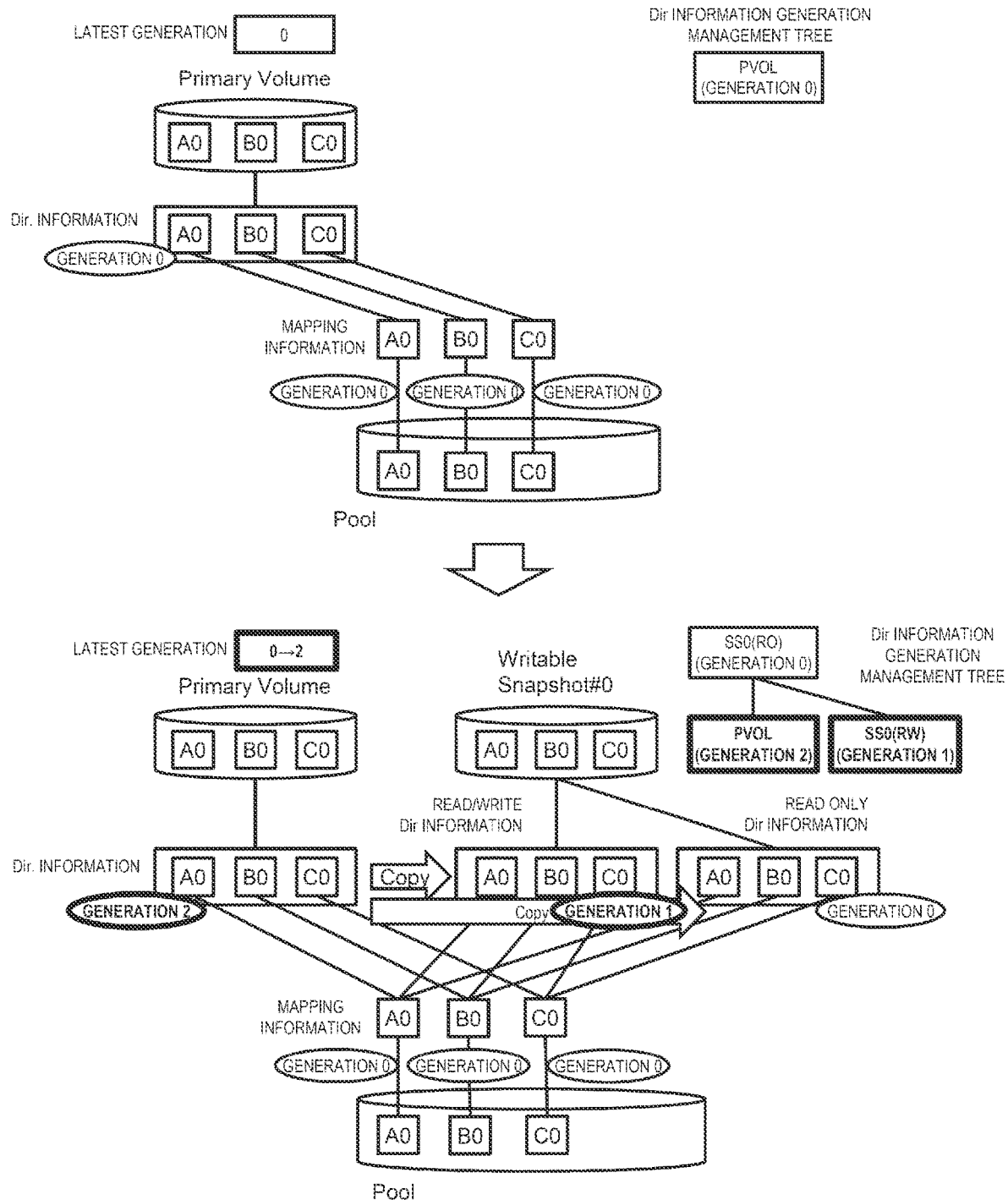
FIG. 27 is an explanatory diagram of acquisition of a writeable snapshot.

FIG. 27 is an explanatory diagram of acquisition of the writeable snapshot. In a case of creating the writeable snapshot, the storage system creates two duplicates of the directory information of the primary volume, one is write-inhibit (read only) directory information, and the other one is write-permit (read/write) directory information.

Then, the latest generation information before the creation of the snapshot is set as the generation of the write-inhibit directory information, the generation in which the generation of the write-permit directory information is incremented is set as the generation of the write-permit directory information, the generation in which the generation of the write-permit directory information is incremented is set as the generation of the latest generation information and the directory information of the primary volume.

In FIG. 27, since the latest generation before the snapshot creation is "0", the write-inhibit directory information is the generation 0, the write-permit directory information is the generation 1, the latest generation after the snapshot creation, and the generation of the directory information of the primary volume are "2".

As a Dir generation information management tree, a write-inhibit snapshot corresponding to the generation 0 is the parent, and a write-permit snapshot corresponding to the generation 1 and the primary volume of the generation 2 are children.

Figure 28:
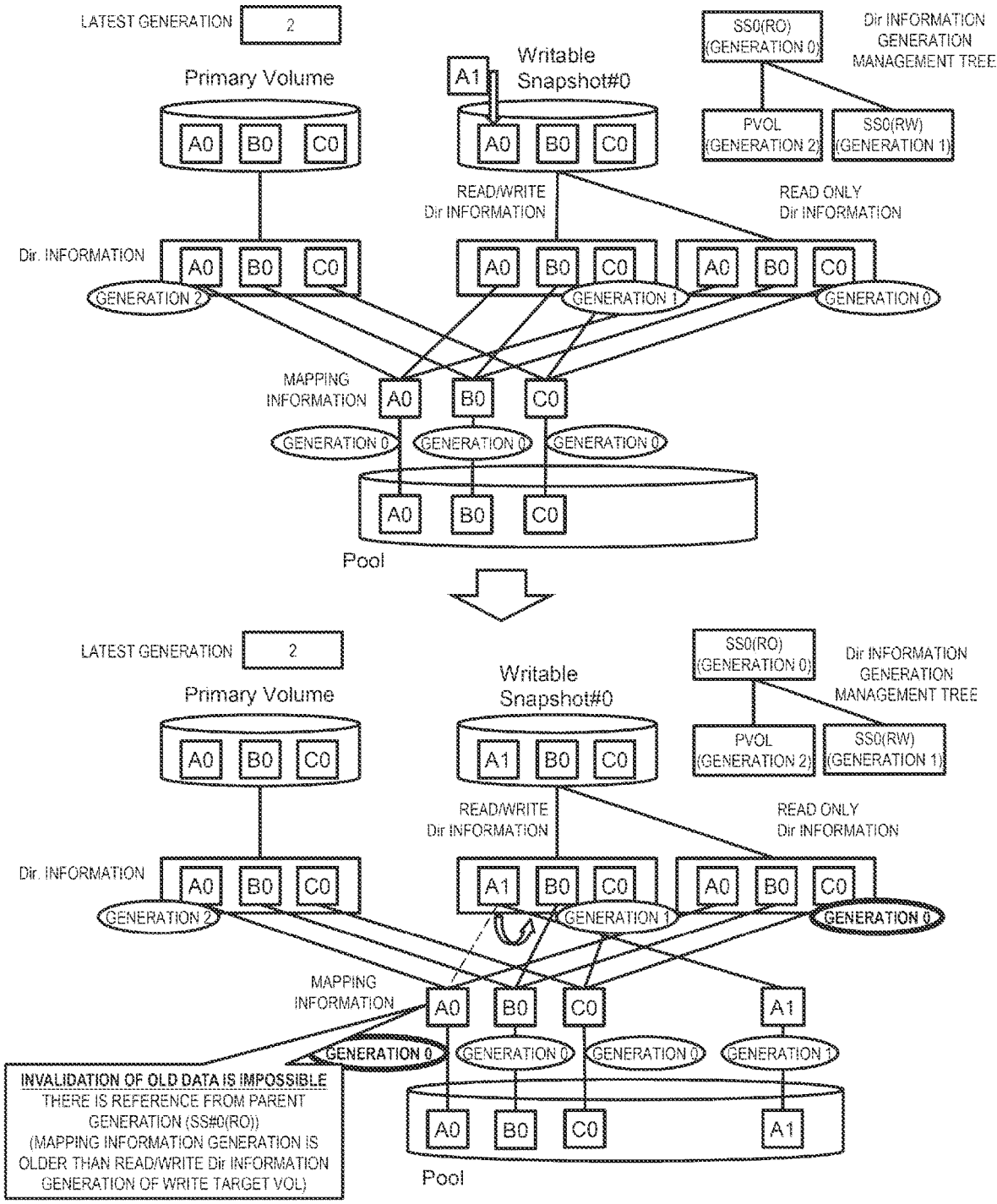
FIG. 28 is an explanatory diagram of writing to the writeable snapshot.

FIG. 28 is an explanatory diagram of writing to the writeable snapshot. When the "A0" of the writeable snapshot is rewritten to "A1", the storage system confirms a new area of the pool volume and stores the data "A1" to be written. New mapping information "A1" is generated for the new data "A1" of the pool volume, and the generation of the writeable snapshot is given as the generation information to the mapping information "A1". Therefore, the mapping information "A1" is the generation 1.

The storage system associates the address of the write destination in the primary volume with the data "A1" to be written by switching the reference relationship (correspondence relationship) between the directory information of the generation 1 and the mapping information.

By this switching of the reference destination, the reference of the mapping information "A0" from the generation 1 is canceled. However, since the mapping information "A0" is still referred to from the write-inhibit directory information (generation 0) of the snapshot #0, the invalidation is not to be permitted.

In the determination of whether to perform this invalidation, by comparing the generation of the mapping information to be determined whether to perform the invalidation and the generation of the directory information of the write target VOL (here, writable snapshot #0), it may be determined that the invalidation is possible if both match, and the invalidation is not possible if the mapping information generation is older. The new state does not occur in the mapping information generation.

Figure 29:
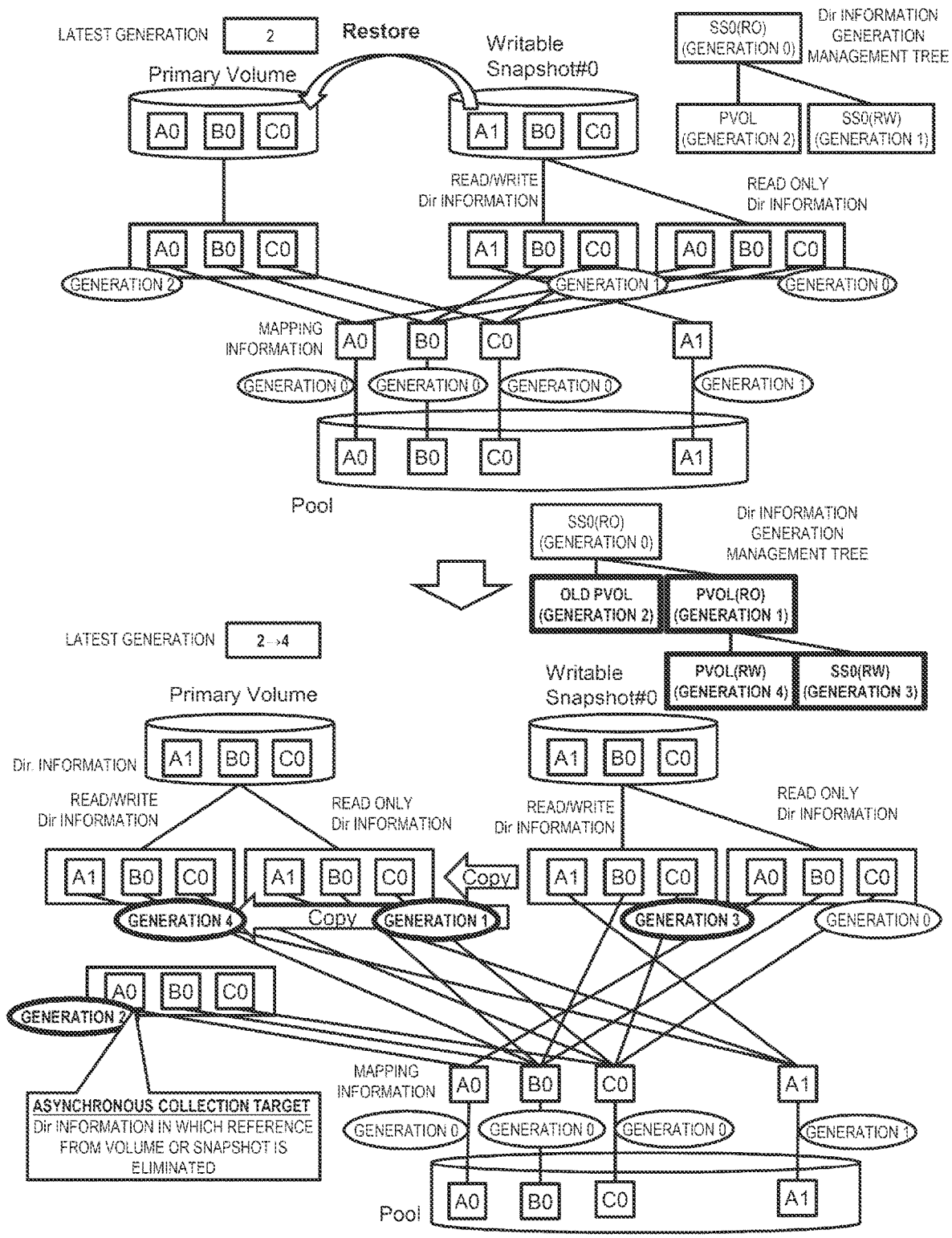
FIG. 29 is an explanatory diagram of the restoration from the writeable snapshot.

FIG. 29 is an explanatory diagram of the restoration from the writeable snapshot.

In a case of restoring from the writeable snapshot, two duplicates of the write-permit directory information are created, one is the write-inhibit (read only) directory information, and the other one is the write-permit (read/write) directory information.

The new write-inhibit directory information indicates a state of the primary volume at a time of the restoration, and takes over the generation of the restore source. The new write-permit directory information indicates a latest state of the state of the primary volume, and the same generation as the latest generation obtained by adding 2 to the generation of the restore source is given. Then, the write-permit directory information of the restore source increments the generation.

In FIG. 29, as a result, the latest generation is "4", the write-inhibit directory information of the restore source is the generation 0, the write-inhibit directory information of the restore destination is the generation 1, and the old directory information of the restore destination is the generation 2, both of which are the children of the generation 0. The write-permit directory information of the restore source is the generation 3, and the write-permit directory information of the restore destination is the generation 4, both of which are the children of the generation 1.

By the restoration, the directory information of the generation 2 is released from the correspondence relationship with the primary volume, and becomes the asynchronous collection target in which the reference from the primary volume or the snapshot is eliminated. That is, the generation 2 is specified as the target generation of the invalidation.

As described above, the storage system disclosed in the embodiment includes: a controller (storage controller 210) configured to provide an access to a logical volume (primary volume) to a host device; and an SSD 220 as a physical storage device configured to store data, and is capable of creating a snapshot which is a duplicate of the logical volume, in which the controller is configured to: form a pool volume corresponding to the logical volume using the physical storage device; store first control information (directory information) associated with the logical volume and the snapshot and second control information (mapping information) associated with data on the pool volume; manage data of the logical volume and the snapshot by associating the first control information with the second control information; manage a time series of the logical volume and one or a plurality of snapshots using generation information associated with the first control information; manage, for each piece of data on the pool volume, generation information indicating a generation in which the data is created in association with the second control information; execute invalidation of the first control information and/or the second control information asynchronously with a processing of data related to the logical volume and/or the snapshot; and determine whether the invalidation is possible by referring to the generation information associated with the first control information and generation information associated with the second control information in the invalidation.

According to such a configuration and operation, since the invalidation of the meta information is not necessary at the time of the restoration, the restoration can be speeded up. Since it is possible to efficiently determine whether the invalidation is possible without including the meta information of a reverse reference system (for example, reference information from storage data of a pool to the primary volume or snapshot), a processing related to data duplication can be speeded up.

Further, according to the disclosed storage system, when a generation of the first control information to be invalidated is specified as a target generation, the controller is configured to determine whether the invalidation is possible based on a reference state in a one-generation old generation in a direct system of the target generation and a reference state in a one-generation new generation in the direct system of the target generation.

That is, since it is not necessary to see all generations in the disclosed storage system and only one generation before and after is sufficient, it is possible to efficiently determine whether the invalidation is possible.

Further, according to the disclosed storage system, the controller is configured to: manage latest generation information; store the latest generation information before creation in generation information of the created snapshot and increment the latest generation information when the snapshot is created for the logical volume; and increment the latest generation information even when the logical volume is restored from the snapshot.

Therefore, by comparing with the latest generation, it is possible to efficiently manage whether the invalidation is possible.

Further, according to the disclosed storage system, the controller is configured to: when writing is performed in the logical volume, store data to be written in a new area of the pool volume, associate an address of a write destination in the logical volume with the data to be written and associate a generation of the logical volume with the second control information by switching a correspondence relationship between the first control information and the second control information; set second control information whose correspondence relationship with the first control information is canceled by switching the correspondence relationship as a target of the invalidation; and determine that the invalidation is possible if a generation of the second control information to be invalidated matches a generation associated with the first control information of the logical volume by comparison.

According to such a configuration, it is possible to determine the invalidation of the storage data already stored at a time of a write processing, and it is possible to efficiently determine whether the invalidation is possible.

Further, according to the disclosed storage system, the controller is configured to: manage latest generation information; duplicate first control information of a snapshot of a restore source, associate the first control information with the logical volume, and increment the latest generation information, when restoring the logical volume from the snapshot; specify the generation information of the first control information associated with the logical volume before the restoration as a target generation of the invalidation; and determine that the invalidation is possible for the second control information associated with the first control information of the target generation, when a generation associated with the second control information is newer than a one-generation old generation in a direct system of the target generation by comparison and is not referred to from a one-generation new generation in the direct system of the target generation.

According to such a configuration, it is possible to improve the efficiency of the invalidation processing of unnecessary data and meta information generated with the restoration.

Further, according to the disclosed storage system, the controller is configured to: specify the generation information associated with the first control information of a deleted snapshot as a target generation of the invalidation, when the snapshot is deleted; and determine that the invalidation is possible for the second control information associated with the first control information of the target generation, when a generation associated with the second control information is newer than a one-generation old generation in a direct system of the target generation by comparison and is not referred to from a one-generation new generation in the direct system of the target generation.

According to such a configuration, it is possible to improve the efficiency of the invalidation processing of the unnecessary data and the meta information generated with the deletion of the snapshot.

Further, according to the disclosed storage system, the controller is configured to invalidate corresponding data when the second control information is invalidated.

Therefore, it is possible to efficiently invalidate the meta information and the data asynchronously.

Further, according to the disclosed storage system, the controller is configured to: manage latest generation information; and in a case of creating a writable snapshot for the logical volume, create first control information for write inhibition and first control information for write permission, set the latest generation information before creation of the snapshot as a generation of the first control information for the write inhibition, and set a generation in which a generation of the first control information of the write inhibition is incremented as a generation of the first control information for the write permission.

According to such a configuration, even when the writable snapshot is adopted, it is possible to implement a higher speed of the processing related to the data duplication.

The invention is not limited to the above embodiments, and includes various modifications. For example, the embodiments described above are described in detail for easy understanding of the invention, and the invention is not necessarily limited to those including all of the configurations described above. In addition, the configuration is not limited to being deleted, and the configuration may be replaced or added.

Further, a part or all of the above-mentioned configurations, functions, processing units, processing means, and the like may be implemented by hardware, for example, by designing an integrated circuit. Further, the invention can also be implemented by a program code of software that implements the functions of the embodiment. In this case, a recording medium recording the program code is provided to a computer, and a processor included in the computer reads out the program code stored in the recording medium. In this case, the program code itself read out from the recording medium implements the functions of the embodiments described above, and the program code itself and the recording medium recording the program code constitute the invention. As a recording medium for supplying such a program code, for example, a flexible disk, a CD-ROM, a DVD-ROM, a hard disk, a solid state drive (SSD), an optical disk, a magneto-optical disk, a CD-R, a magnetic tape, a nonvolatile memory card, and a ROM are used.

For example, the program code that implements the function described in the present embodiment can be implemented by a wide range of programs or script languages, such as an assembler, C/C++, perl, Shell, PHP, and Java (registered trademark).

In the embodiments described above, control lines and information lines are considered to be necessary for description, and all control lines and information lines are not necessarily shown in the product. All configurations may be connected to each other.

What is claimed is:
1. A storage system, comprising:
  a controller configured to provide a logical volume to a host device; and
  a physical storage device configured to store data,
  the storage system being capable of creating a snapshot which is a duplicate of the logical volume, wherein
  the controller is configured to:
  form a pool volume corresponding to the logical volume using the physical storage device;
  store first control information associated with the logical volume and the snapshot and second control information associated with data on the pool volume;

manage data of the logical volume and the snapshot by associating the first control information with the second control information;
manage a time series of the logical volume and one or a plurality of snapshots using generation information associated with the first control information;
manage, for each piece of data on the pool volume, generation information indicating a generation in which the data is created in association with the second control information;
execute invalidation of the first control information and/or the second control information asynchronously with a processing of data related to the logical volume and/or the snapshot;
determine whether the invalidation is possible by referring to the generation information associated with the first control information and generation information associated with the second control information in the invalidation; and
when a generation of the first control information to be invalidated is specified as a target generation, determine whether the invalidation is possible based on a reference state in a one-generation old generation in a direct system of the target generation and a reference state in a one-generation new generation in the direct system of the target generation.

2. A storage system, comprising:
a controller configured to provide a logical volume to a host device; and
a physical storage device configured to store data,
the storage system being capable of creating a snapshot which is a duplicate of the logical volume, wherein
the controller is configured to:
form a pool volume corresponding to the logical volume using the physical storage device;
store first control information associated with the logical volume and the snapshot and second control information associated with data on the pool volume;
manage data of the logical volume and the snapshot by associating the first control information with the second control information;
manage a time series of the logical volume and one or a plurality of snapshots using generation information associated with the first control information;
manage, for each piece of data on the pool volume, generation information indicating a generation in which the data is created in association with the second control information;
execute invalidation of the first control information and/or the second control information asynchronously with a processing of data related to the logical volume and/or the snapshot;
determine whether the invalidation is possible by referring to the generation information associated with the first control information and generation information associated with the second control information in the invalidation;
manage latest generation information;
when the snapshot is created for the logical volume, store the latest generation information before creation in generation information of the created snapshot and increment the latest generation information; and
increment the latest generation information even when the logical volume is restored from the snapshot.

3. A storage system, comprising:
a controller configured to provide a logical volume to a host device; and
a physical storage device configured to store data,
the storage system being capable of creating a snapshot which is a duplicate of the logical volume, wherein
the controller is configured to:
form a pool volume corresponding to the logical volume using the physical storage device;
store first control information associated with the logical volume and the snapshot and second control information associated with data on the pool volume;
manage data of the logical volume and the snapshot by associating the first control information with the second control information;
manage a time series of the logical volume and one or a plurality of snapshots using generation information associated with the first control information;
manage, for each piece of data on the pool volume, generation information indicating a generation in which the data is created in association with the second control information;
execute invalidation of the first control information and/or the second control information asynchronously with a processing of data related to the logical volume and/or the snapshot;
determine whether the invalidation is possible by referring to the generation information associated with the first control information and generation information associated with the second control information in the invalidation;
when writing is performed in the logical volume, store data to be written in a new area of the pool volume, associate an address of a write destination in the logical volume with the data to be written and associate a generation of the logical volume with the second control information by switching a correspondence relationship between the first control information and the second control information;
set second control information whose correspondence relationship with the first control information is canceled by switching the correspondence relationship as a target of the invalidation; and
determine that the invalidation is possible if a generation of the second control information to be invalidated matches a generation associated with the first control information of the logical volume by comparison.

4. A storage system, comprising:
a controller configured to provide a logical volume to a host device; and
a physical storage device configured to store data,
the storage system being capable of creating a snapshot which is a duplicate of the logical volume, wherein
the controller is configured to:
form a pool volume corresponding to the logical volume using the physical storage device;
store first control information associated with the logical volume and the snapshot and second control information associated with data on the pool volume;
manage data of the logical volume and the snapshot by associating the first control information with the second control information;
manage a time series of the logical volume and one or a plurality of snapshots using generation information associated with the first control information;
manage, for each piece of data on the pool volume, generation information indicating a generation in which the data is created in association with the second control information;

execute invalidation of the first control information and/or the second control information asynchronously with a processing of data related to the logical volume and/or the snapshot;

determine whether the invalidation is possible by referring to the generation information associated with the first control information and generation information associated with the second control information in the invalidation manage latest generation information;

when restoring the logical volume from the snapshot, duplicate first control information of a snapshot of a restore source, associate the first control information with the logical volume, and increment the latest generation information;

specify the generation information of the first control information associated with the logical volume before the restoration as an invalidation target generation of the invalidation; and when a generation associated with the second control information is newer than a one-generation old generation in a direct system of the target generation by comparison and is not referred to from a one-generation new generation in the direct system of the target generation, determine that the invalidation is possible for the second control information associated with the first control information of the target generation.

5. A storage system, comprising:
a controller configured to provide a logical volume to a host device; and
a physical storage device configured to store data,
the storage system being capable of creating a snapshot which is a duplicate of the logical volume, wherein
the controller is configured to:
form a pool volume corresponding to the logical volume using the physical storage device;
store first control information associated with the logical volume and the snapshot and second control information associated with data on the pool volume;
manage data of the logical volume and the snapshot by associating the first control information with the second control information;
manage a time series of the logical volume and one or a plurality of snapshots using generation information associated with the first control information;
manage, for each piece of data on the pool volume, generation information indicating a generation in which the data is created in association with the second control information;
execute invalidation of the first control information and/or the second control information asynchronously with a processing of data related to the logical volume and/or the snapshot;
determine whether the invalidation is possible by referring to the generation information associated with the first control information and generation information associated with the second control information in the invalidation;
when the snapshot is deleted, specify the generation information associated with the first control information of a deleted snapshot as an invalidation target generation of the invalidation; and
when a generation associated with the second control information is newer than a one-generation old generation in a direct system of the target generation by comparison and is not referred to from a one-generation new generation in the direct system of the target generation, determine that the invalidation is possible for the second control information associated with the first control information of the target generation.

6. A storage system, comprising:
a controller configured to provide a logical volume to a host device; and
a physical storage device configured to store data,
the storage system being capable of creating a snapshot which is a duplicate of the logical volume, wherein
the controller is configured to:
form a pool volume corresponding to the logical volume using the physical storage device;
store first control information associated with the logical volume and the snapshot and second control information associated with data on the pool volume;
manage data of the logical volume and the snapshot by associating the first control information with the second control information;
manage a time series of the logical volume and one or a plurality of snapshots using generation information associated with the first control information;
manage, for each piece of data on the pool volume, generation information indicating a generation in which the data is created in association with the second control information;
execute invalidation of the first control information and/or the second control information asynchronously with a processing of data related to the logical volume and/or the snapshot;
determine whether the invalidation is possible by referring to the generation information associated with the first control information and generation information associated with the second control information in the invalidation; and
when the second control information is invalidated, invalidate corresponding data.

7. A storage system, comprising:
a controller configured to provide a logical volume to a host device; and
a physical storage device configured to store data,
the storage system being capable of creating a snapshot which is a duplicate of the logical volume, wherein
the controller is configured to:
form a pool volume corresponding to the logical volume using the physical storage device;
store first control information associated with the logical volume and the snapshot and second control information associated with data on the pool volume;
manage data of the logical volume and the snapshot by associating the first control information with the second control information;
manage a time series of the logical volume and one or a plurality of snapshots using generation information associated with the first control information;
manage, for each piece of data on the pool volume, generation information indicating a generation in which the data is created in association with the second control information;
execute invalidation of the first control information and/or the second control information asynchronously with a processing of data related to the logical volume and/or the snapshot;
determine whether the invalidation is possible by referring to the generation information associated with the first control information and generation information associated with the second control information in the invalidation;

manage latest generation information; and in a case of creating a writable snapshot for the logical volume:

create first control information for write inhibition and first control information for write permission, set the latest generation information before creation of the snapshot as a generation of the first control information for the write inhibition, and set a generation in which a generation of the first control information of the write inhibition is incremented as a generation of the first control information for the write permission.

\* \* \* \* \*